US010321336B2

(12) United States Patent
Li et al.

(10) Patent No.: US 10,321,336 B2
(45) Date of Patent: Jun. 11, 2019

(54) SYSTEMS AND METHODS FOR ROBUSTLY DETERMINING TIME SERIES RELATIONSHIPS IN WIRELESS NETWORKS

(71) Applicant: Futurewei Technologies, Inc., Plano, TX (US)

(72) Inventors: Ying Li, Bridgewater, NJ (US); Baoling S. Sheen, Kildeer, IL (US); Jin Yang, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 502 days.

(21) Appl. No.: 15/072,025

(22) Filed: Mar. 16, 2016

(65) Prior Publication Data

US 2017/0272960 A1    Sep. 21, 2017

(51) Int. Cl.
*H04W 24/02* (2009.01)
*H04L 12/24* (2006.01)
*H04W 28/02* (2009.01)

(52) U.S. Cl.
CPC ......... *H04W 24/02* (2013.01); *H04L 41/0816* (2013.01); *H04W 28/0268* (2013.01)

(58) Field of Classification Search
CPC combination set(s) only.
See application file for complete search history.

(56) References Cited

U.S. PATENT DOCUMENTS

| 9,071,677 | B2 * | 6/2015 | Aggarwal | H04M 3/2227 |
| 9,130,860 | B1 * | 9/2015 | Boe | G06F 17/30572 |
| 2007/0225835 | A1 * | 9/2007 | Zhu | G05B 13/042 700/44 |
| 2012/0266094 | A1 * | 10/2012 | Starr | H04L 41/22 715/771 |
| 2013/0272150 | A1 * | 10/2013 | Wan | H04L 43/08 370/252 |
| 2014/0222996 | A1 * | 8/2014 | Vasseur | H04L 41/16 709/224 |
| 2014/0222998 | A1 * | 8/2014 | Vasseur | H04L 41/16 709/224 |

(Continued)

FOREIGN PATENT DOCUMENTS

| CN | 102104901 A | 6/2011 |
| CN | 102149119 A | 8/2011 |

(Continued)

*Primary Examiner* — Mounir Moutaouakil
(74) *Attorney, Agent, or Firm* — Slater Matsil, LLP

(57) ABSTRACT

Quality of service problems in wireless networks can be identified, and in some cases resolved, autonomously using an optimization technique that adjusts parameters of the wireless network based on relationships between key quality indicators (KQIs) and key performance indicators (KPIs). A KQI may be used to gauge the quality of service/experience collectively observed by users/devices when communicating a particular type of traffic in a wireless network or wireless network area. A KPI may be any specific performance metric of a wireless network tending to have a causal or correlative relationship with a KQI. Different types of relationships between a KQI and KPIs may be used to evaluate a quality of service problem, including correlation coefficients, slopes of linear regression, hit-ratios, and others.

16 Claims, 9 Drawing Sheets

(56) References Cited

U.S. PATENT DOCUMENTS

| | | | |
|---|---|---|---|
| 2014/0337871 A1* | 11/2014 | Garcia De Blas | ............................ H04N 21/64738 725/14 |
| 2015/0119020 A1* | 4/2015 | Henderson | ............ H04W 16/18 455/423 |
| 2015/0199136 A1* | 7/2015 | Faulkner | ............... G06F 3/0611 711/114 |
| 2015/0281004 A1* | 10/2015 | Kakadia | ................ H04L 41/147 370/235 |
| 2015/0304191 A1* | 10/2015 | Groenendijk | ....... H04L 41/5032 370/252 |
| 2015/0325017 A1* | 11/2015 | Fletcher | ................ G06T 11/206 345/440 |
| 2015/0347953 A1* | 12/2015 | Saito | ........................ G06F 17/18 705/7.39 |
| 2016/0105330 A1* | 4/2016 | Choudhary | ....... G06F 17/30572 715/736 |
| 2016/0112894 A1* | 4/2016 | Lau | ........................ H04W 24/10 370/252 |
| 2016/0157114 A1* | 6/2016 | Kalderen | .............. H04W 24/08 370/252 |
| 2016/0162346 A1* | 6/2016 | Kushnir | ................ G06F 11/079 714/37 |
| 2016/0189079 A1* | 6/2016 | Gajdzinski | ....... G06Q 10/06375 705/7.37 |
| 2016/0292611 A1* | 10/2016 | Boe | .................. G06Q 10/06393 |
| 2017/0208487 A1* | 7/2017 | Ratakonda | ............. H04W 24/04 |
| 2017/0262781 A1* | 9/2017 | Yang | ................. G06Q 10/06395 |
| 2018/0006957 A1* | 1/2018 | Ouyang | ............. H04L 47/2416 |
| 2018/0052912 A1* | 2/2018 | Fletcher | ............ G06F 17/30675 |

FOREIGN PATENT DOCUMENTS

| | | | |
|---|---|---|---|
| CN | 103312531 A | 9/2013 | |
| CN | 105050125 A | 11/2015 | |
| WO | WO 2017157171 A1 * | 9/2017 | ........ G06Q 10/06393 |

* cited by examiner

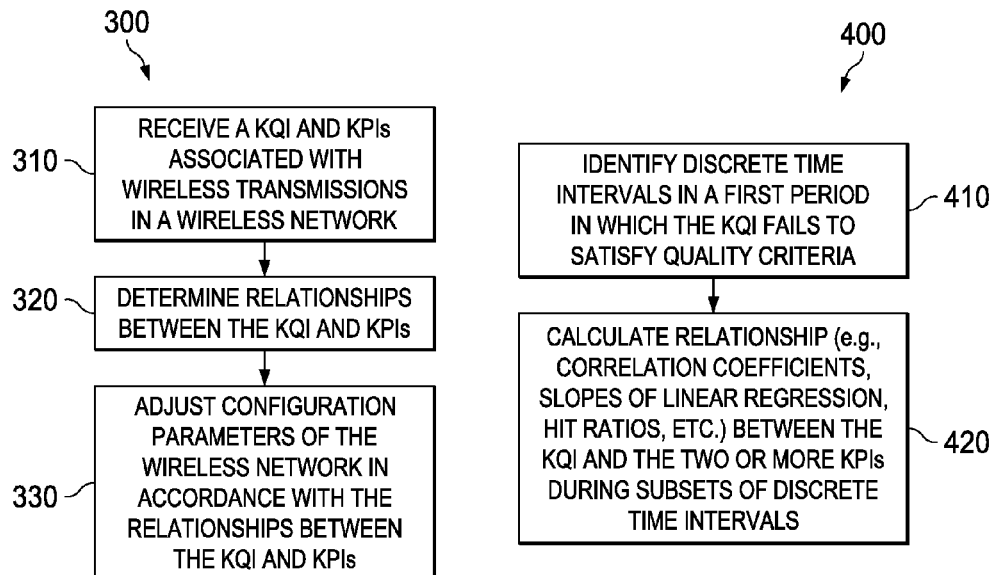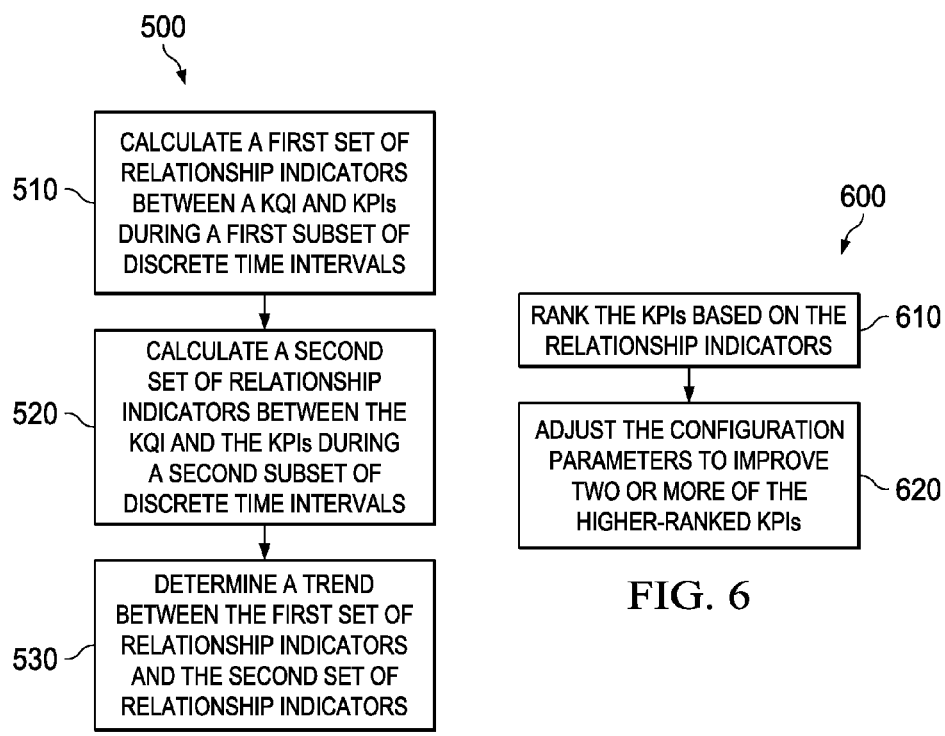

SYSTEMS AND METHODS FOR ROBUSTLY DETERMINING TIME SERIES RELATIONSHIPS IN WIRELESS NETWORKS

TECHNICAL FIELD

The present invention relates generally to a system and method wireless communications, and, in particular embodiments, to systems and methods for robustly determining time series relationships in wireless networks.

BACKGROUND

Network operators monitor wireless networks to identify quality of service or quality of experience problems. For complex cases, network operators may retain a subject matter expert to analyze network diagnostic information and adjust wireless network parameters to identify and troubleshoot the underlying quality of service problem. Subject matter experts are not always readily available, and their results vary based on the skill and experience of the individual retained. Accordingly, autonomous techniques for diagnosing and resolving quality of service problems in wireless networks are desired.

SUMMARY OF THE INVENTION

Technical advantages are generally achieved, by embodiments of this disclosure which describe systems and methods for robustly determining time series relationships in wireless networks.

In accordance with an embodiment, a method for adjusting parameters of a wireless network is provided. The method includes receiving a key quality indicator (KQI) and two or more key performance indicators (KPIs) associated with wireless transmissions in a wireless network during a first period, determining relationships between the KQI and the two or more KPIs, and adjusting configuration parameters that are to be used to operate the wireless network during a second or subsequent period based on the relationships between the KQI and the two or more KPIs. In an embodiment, determining the relationships between a KQI and KPIs includes identifying one or more subsets of discrete time intervals in the first period in which the KQI fails to satisfy quality criteria, and calculating relationship indicators between the KQI and the KPIs during the one or more subsets of discrete time intervals. In that embodiment, determining relationships between the KQI and the two or more KPIs during the one or more subsets of discrete time intervals may include calculating a first set of relationship indicators between the KQI and the two or more KPIs during the first subset of discrete time intervals, calculating a second set of relationship indicators between the KQI and the two or more KPIs during the second subset of discrete time intervals, and determining a trend between at least the first set of relationship indicators and the second set of relationship indicators.

In an embodiment, adjusting configuration parameters of the wireless network in accordance with the relationships between the KQI and the KPIs includes ranking the two or more KPIs based on the relationship indicators, and adjusting the configuration parameters to improve two or more of the higher-ranked KPIs.

In an embodiment, determining the relationships between the KQI and the two or more KPIs comprises identifying a first subset of discrete time intervals in the first period in which both a value of the KQI exceeds a quality threshold and a value of a first KPI exceeds a first performance threshold, and identifying a second subset of discrete time intervals during the first period in which both the value of the KQI exceeds the quality threshold and a value of a second KPI exceeds a second performance threshold. In this embodiment, the method further includes calculating a first relationship indicator between the KQI and the first KPI during the first subset of discrete time intervals and a second relationship indicator between the KQI and the second KPI during the second subset of discrete time intervals. In such an embodiment, adjusting the configuration parameters of the wireless network in accordance with the relationships between the KQI and the KPIs may include adjusting the configuration parameters to improve the first KPI when the first relationship indicator exceeds the second relationship indicator, and adjusting the configuration parameters to improve the second KPI when the second relationship indicator exceeds the first relationship indicator. An apparatus for performing these methods is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 illustrates a flowchart of an embodiment method for adjusting wireless network configuration parameters;

FIG. 4 illustrates a flowchart of an embodiment method for determining relationships between a key quality indicator (KQI) and key performance indicators (KPIs);

FIG. 5 illustrates a flowchart of another embodiment method for determining relationships between a KQI and KPIs;

FIG. 6 illustrates a flowchart of an embodiment method for adjusting wireless configuration parameters based on relationships between a KQI and KPIs;

DETAILED DESCRIPTION OF ILLUSTRATIVE EMBODIMENTS

Figure 1:
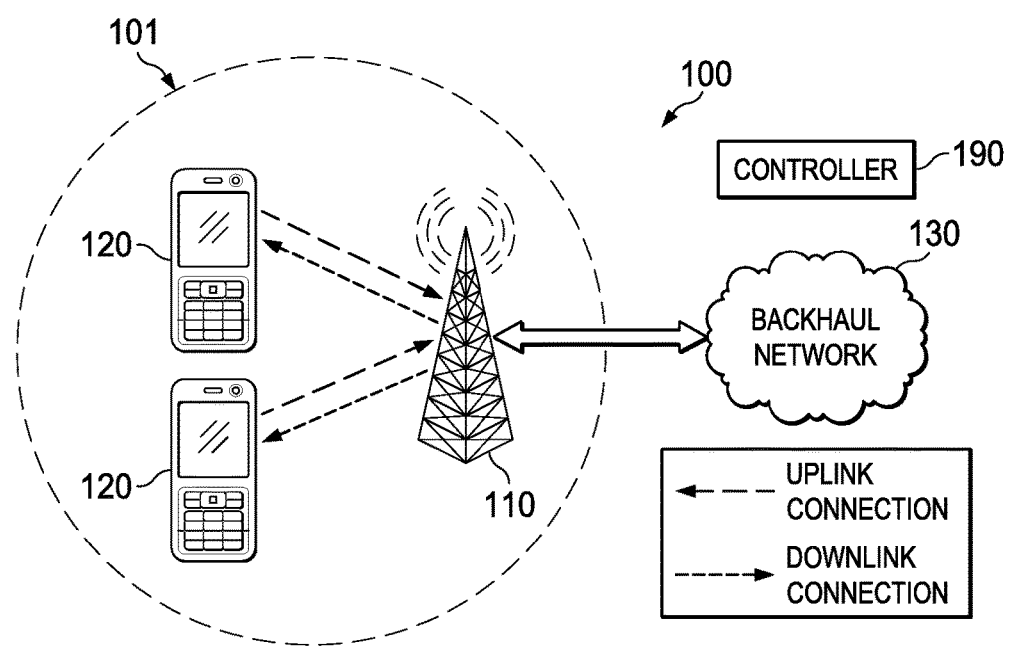
FIG. 1 illustrates a diagram of an embodiment wireless communications network.

The structure, manufacture and use of embodiments are discussed in detail below. It should be appreciated, however, that this disclosure provides many applicable inventive concepts that can be embodied in a wide variety of specific contexts. The specific embodiments discussed herein are merely illustrative of specific examples of the inventive aspects, and do not limit the scope of the claims. As used herein, the term "discrete time interval" refers to an interval of time (e.g., minute, hour, etc.) during a monitoring period (e.g., day, week, etc.).

Aspects of this disclosure provide optimization techniques for autonomously identifying and troubleshooting quality of service problems in wireless networks. In particular, embodiment optimization techniques determine relationships between key quality indicators (KQIs) and key performance indicators (KPIs) obtained from a wireless network, and then adjust configuration parameters of the wireless network based on those relationships. A KQI may be any metric that is used to gauge the quality of service/experience collectively observed by users/devices when communicating a particular type of traffic in a wireless network or wireless network area. For example, a KQI for voice traffic may be an uplink packet loss rate, since poor/choppy audio quality is generally attributable to uplink packets being dropped. A KPI may be any specific performance metric of a wireless network tending to have a causal or correlative relationship with a KQI. By way of example, KPIs for an uplink packet loss rate may include a reference signal power level and a channel interference level because uplink packets are often dropped due to either poor network coverage (e.g., indicated by low Reference Signal Received Power (RSRP) levels) or high channel interference. The values of a KQI and one or more KPIs may be normalized such that a high KQI indicates a low quality of service/experience and high KPIs indicate poor performance. While much of this disclosure discusses relationships between a KQI and KPIs in the context of voice traffic transmissions, it should be appreciated that the inventive concepts provided herein may be utilized to determine relationships between KQIs and KPIs for any traffic type communicated over a wireless network. For example, embodiments may determine relationships between a KQI (e.g., a round trip times (RTT)) and KPIs (e.g., a quality of an uplink channel, a quality of a downlink channel for mobile gaming. While this disclosure discusses wireless networks, it should be appreciated that the embodiments are applicable to other communication networks including wired networks, optical networks, or the alike. It should be appreciated that the embodiments are applicable to systems where a relationship between any type of quality indicator and any type of performance indicator are determined, and that the systems may use different names or terminologies to refer to the respective indicators.

A controller may determine how to adjust the network configuration parameters based on the relationships between the KQI and the KPIs. For example, the controller may determine that a high packet loss rate is attributable to poor network coverage when there is a strong relationship between uplink packet loss rates and reference signal power levels. In such an example, the controller may attempt to reduce the packet loss rate by improving network coverage, e.g., by adjusting an antenna tilt or handover margin of a serving base station, by increasing an uplink transmit power level in the coverage area, etc. In another example, the controller may determine that a high packet loss rate is attributable to channel interference when there is a strong relationship between uplink packet loss rates and interference. In such an example, the controller may attempt to reduce the packet loss rate by reducing interference, e.g., by scheduling devices to different frequencies, modifying frequency re-use settings, reducing uplink transmit power levels, etc.

In some embodiments, relationships between a KQI and KPIs may be evaluated during a subset of discrete time intervals in which the KQI fails to satisfy a quality criteria so that the relationships identify KPIs tending to cause the worst-case KQI values. For example, in the context of voice traffic, a controller may identify a subset of discrete time intervals in which the packet loss rate exceeds a certain threshold, and then determine relationships between the packet loss rate and the respective RSRP and interference levels during that subset of discrete time intervals. This may allow the controller to determine whether instances of high packet loss rates are attributable to poor network coverage or high channel interference.

In other embodiments, relationships between a KQI and a given KPI may be evaluated during discrete time intervals in which both the KQI fails to satisfy a quality criteria and the KPI fails to satisfy a performance criteria. For instance, in the context of voice traffic, a controller may identify a first subset of discrete time intervals during a monitoring period in which both the packet loss rate exceeds a packet loss threshold and an RSRP level fails to exceed an RSRP threshold, and a second subset of discrete time intervals during the monitoring period in which both the packet loss rate exceeds the packet loss threshold and an interference level exceeds an interference threshold. In such an example, the controller may determine a relationship between the packet loss rate and the RSRP level during the first subset of discrete time instances, while determining a relationship between the packet loss rate and the interference level during the second subset of discrete time instances. The quality and performance criteria used to select the subset of discrete time intervals may be related, or proportional, to one another. For instance, the packet loss threshold, the RSRP threshold, and the interference threshold may be a corresponding percentage (e.g., worst quantile, worst ten percent, worst five percent, etc.) of the observed packet loss rates, observed RSRP levels, and interference levels during the monitoring period. The corresponding percentage of quality and performance indicators may be normalized. For example, a corresponding percentage of packet loss rates may include the packet loss rates exceeding a corresponding packet loss threshold (e.g., highest ten percent of observed packet loss levels), while the corresponding percentage of RSRP levels include RSRP levels falling below a corresponding RSRP threshold (e.g., lowest ten percent of observed RSRP levels).

In yet other embodiments, relationships between a KQI and a given KPI may be evaluated for two or more sets of discrete time intervals to determine whether the relationship between the KQI and the KPI becomes stronger, or weaker, as the KQI values become worse. For example, in the context of voice traffic, a controller may identify a first subset of discrete time intervals during the monitoring period in which both the packet loss rate exceeds a first packet loss threshold and an RSRP level fails to exceed a first RSRP threshold, and a second subset of discrete time intervals during the monitoring period in which both the packet loss rate exceeds a second packet loss threshold (e.g., that is higher than the first packet loss threshold) and the RSRP level fails to exceed a second RSRP threshold (e.g., that is lower than the first RSRP threshold). This may allow the controller to determine whether the relationship between the packet loss rate and the RSRP level becomes stronger, or weaker, as the packet loss rate increases.

Different types of relationships between a KQI and KPIs may be used to evaluate a quality of service problem. In one embodiment, the evaluated relationships include correlation coefficients between the KQI and each of the KPIs that indicate degrees to which a value of the KQI is related to values of corresponding KPIs. In another embodiment, the evaluated relationships include slopes of linear regression between the KQI and each of the KPIs. The slopes of linear regression may indicate degrees in which a change in a value of the KQI is attributable to changes in values of the KPIs. In yet other embodiments, the relationships include hit-ratios and/or hit-distance correlation coefficients between the KQI and KPIs. These and other aspects are discussed in greater detail below.

FIG. 1 is a diagram of a wireless network 100 for communicating data. The wireless network 100 includes a base station 110 having a wireless coverage area 101, a plurality of mobile devices 120, a backhaul network 130, and a controller 190. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an evolved NodeB (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac. As used herein, the term "mobile device" refers to any component (or collection of components) capable of establishing a wireless connection with a base station, such as a user equipment (UE), a mobile station (STA), relay, device engaging in machine type communications, or other wirelessly enabled devices. The controller 190 may be any component, or collection of components, adapted to perform network optimization for the wireless coverage area 101. The controller 190 may be co-located with the base station 110. Alternatively, the controller 190 may be separate and distinct from the base station 110, in which case the controller 190 may communicate with the base station over the backhaul network 130. In some embodiments, the network 100 may comprise various other wireless devices, such as low power nodes, etc.

Aspects of this disclosure provide optimization techniques that determine relationships between KQIs and KPIs associated with transmissions in a wireless network, and then adjust configuration parameters of the wireless network based on those relationships. In one example, the controller 190 receives a KQI and KPIs from the base station 110 that were associated with wireless transmissions in the wireless coverage area 101 during an initial period. An initial period may be a period of time in which KQI and/or KPIs are monitored in one or more wireless coverage areas of a wireless network. The controller 190 then determines relationships between the KQI and KPIs, and adjusts configuration parameters of the wireless network area 101 accordingly. The adjusted configuration parameters are used to communicate transmissions in the wireless network area 101 during a subsequent period. The KQI and/or KPIs may or may not be monitored during the subsequent period. The subsequent period and the initial period may be the same length time periods, or different length time periods.

Figure 2:
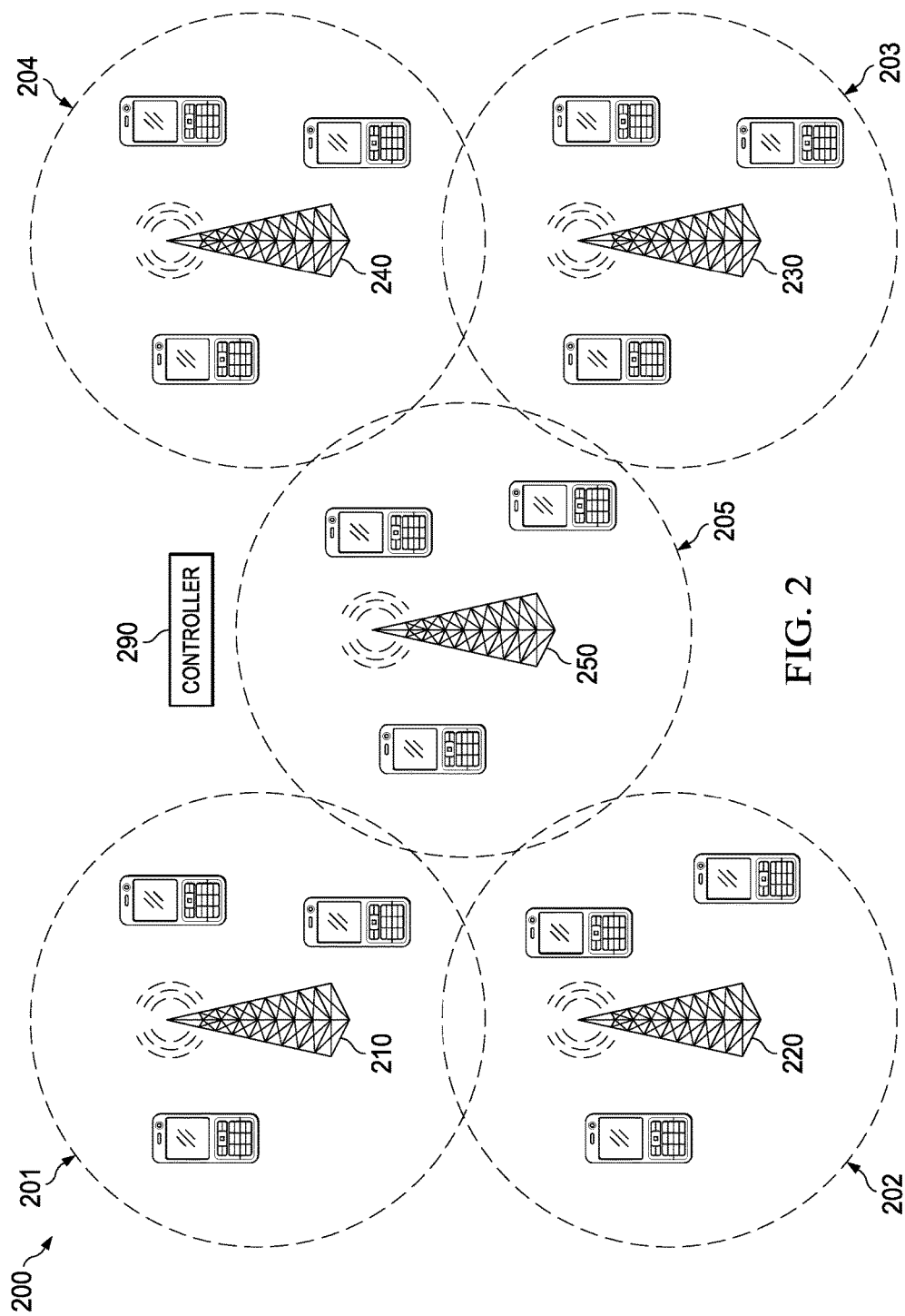
FIG. 2 illustrates a diagram of an embodiment wireless communications network that includes multiple coverage areas.

In some embodiments, network optimization is performed for a cluster of wireless coverage areas in a wireless network. FIG. 2 illustrates a wireless network 200 comprising wireless coverage areas 201, 202, 203, 204, 205 within which wireless access is provided to mobile devices by base stations 210, 220, 230, 240, 250 (respectively). A KQI in one wireless coverage area may be affected by configuration parameters in one or more neighboring wireless coverage areas. Accordingly, the base stations 210, 220, 230, 240, 250 may report KQIs and KPIs to the controller 290. The controller 290 may determine relationships between the KQIs and KPIs, and then adjust configuration parameters of the wireless coverage areas 201, 202, 203, 204, 205 accordingly.

FIG. 3 illustrates an embodiment method 300 for adjusting parameters of a wireless network, as may be performed by a controller. At step 310, the controller receives at least one KQI and two or more KPIs associated with wireless transmissions in a wireless network during a first period. In some embodiments, the controller receives quality indicators and performance indicator from multiple base stations in neighboring wireless network coverage areas. At step 320, the controller determines relationships between the KQI and KPIs. This may include calculating correlations between the KQI and KPIs, slopes of linear regression between the KQI and KPIs, hit-ratios between the KQI and KPIs, and/or hit-distance correlation coefficients between the KQI and KPIs. At step 330, the controller adjusts configuration parameters of the wireless network in accordance with the relationships between the quality indicator and the two or more performance indicators.

Various techniques are provided for determining relationships between a KQI and KPIs. FIG. 4 illustrates an embodiment method 400 for determining relationships between a KQI and KPIs, as may be performed by a controller. At step 410, the controller identifies subsets of discrete time intervals in a first period in which a KQI fails to satisfy quality criteria. In one example, the controller identifies a subset of discrete time intervals in which packet loss exceeds a threshold. At step 420, the controller determines relationships between the KQI and the KPIs during the discrete time intervals identified in step 410. This may include calculating correlation coefficients, slopes of linear regression, hit-ratios, or hit-distance correlation coefficients between the KQI and each of the KPIs during the subsets of discrete time intervals. In one example, the controller determines a first relationship between packet loss and an RSRP level during a subset of discrete time intervals and a second relationship between packet loss and an RSRP level during the same, or different, subset of discrete time intervals.

In some embodiments, relationships between a KPI and KQIs are determined over different subsets of discrete time intervals. FIG. 5 illustrates an embodiment method 500 for determining relationships between a KQI and KPIs during subsets of discrete time intervals, as may be performed by a controller. At step 510, the controller calculates a first set of relationship indicators between the KQI and the two or more KPIs during a first subset of discrete time intervals. At step 520, the controller calculates a second set of relationship indicators between the KQI and the KPIs during a second subset of discrete time intervals. In one example, the first set of discrete time intervals include intervals in which the KQI exceeds a first threshold, and the second set of discrete time intervals includes intervals in which the KQI exceeds a second threshold that is higher than the first threshold. At step 530, the controller determines a trend between the first set of relationship indicators and the second set of relationship indicators. This may include determining whether one of the KPIs tends to have a higher correlation with the KQI when the KQI exceeds the higher of the two thresholds.

Various techniques are provided for adjusting configuration parameters based on relationship indicators between a KQI and KPIs. FIG. 6 illustrates an embodiment method 600 for adjusting wireless configuration parameters based on relationships between a KQI and KPIs, as may be performed by a controller. At step 610, the controller ranks the KPIs based on the relationship indicators. In one example, this includes ranking KPIs based on the strength of their correlation coefficients. At step 620, the controller adjusts the configuration parameters to improve higher-ranked KPIs.

Figure 7:
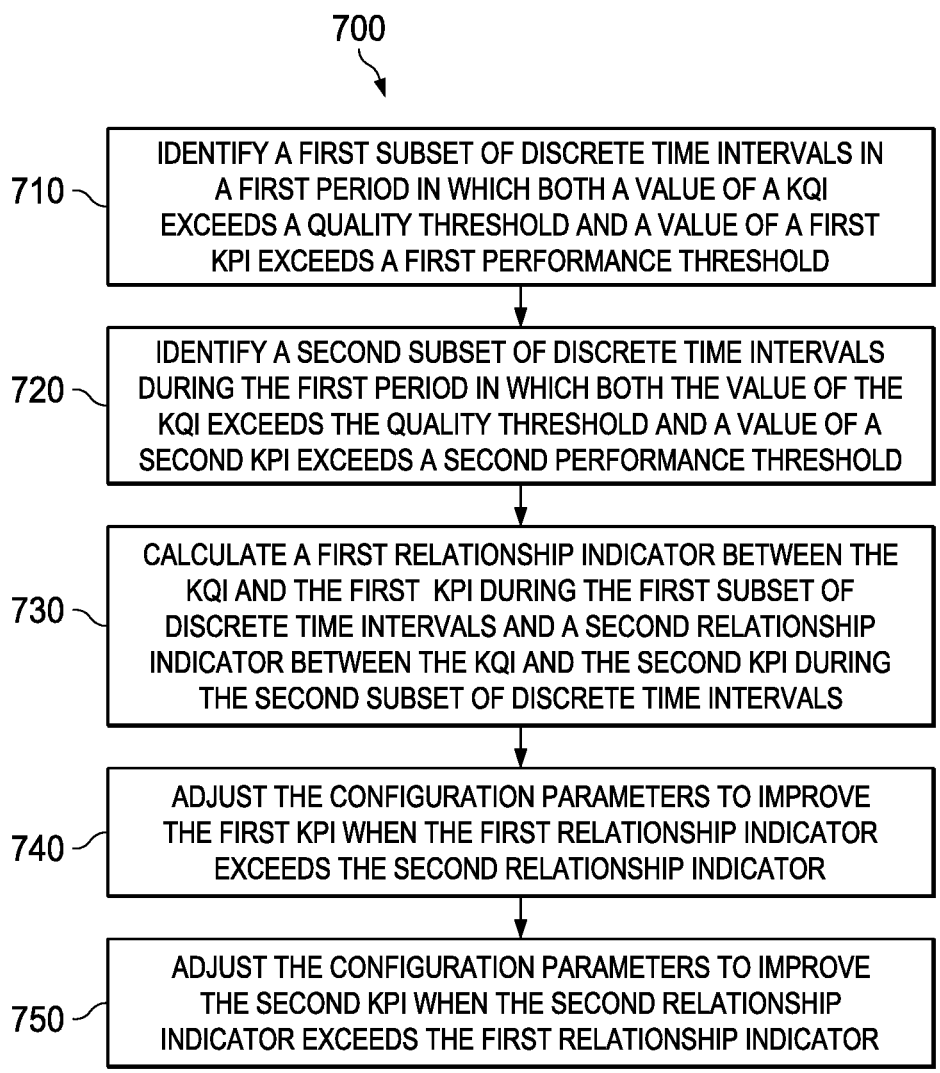
FIG. 7 illustrates a flowchart of another embodiment method for adjusting wireless configuration parameters based on relationships between a KQI and KPIs.

FIG. 7 illustrates an embodiment method 700 for adjusting wireless configuration parameters based on relationships between a KQI and KPIs, as may be performed by a controller. At step 710, the controller identifies a first subset of discrete time intervals in a first period in which both a value of the KQI exceeds a quality threshold and a value of a first KPI exceeds a first performance threshold. At step 720, the controller identifies a second subset of discrete time intervals during the first period in which both the value of the KQI exceeds the quality threshold and a value of a second KPI exceeds a second performance threshold. At step 730, the controller calculate a first relationship indicator between the KQI and the first KPI during the first subset of discrete time intervals and a second relationship indicator between the KQI and the second KPI during the second subset of discrete time intervals. At step 740, the controller adjusts the configuration parameters to improve the first KPI when the first relationship indicator exceeds the second relationship indicator. At step 750, the controller adjusts the configuration parameters to improve the second KPI when the second relationship indicator exceeds the first relationship indicator.

Different KQIs and KPIs may be monitored for different traffic types in a wireless network. As mentioned above, uplink packet loss rates may be an important KQI for voice traffic transmissions. KPIs for uplink packet loss rates may include any parameter or measurement associated with a common root cause of uplink packet loss.

An uplink packet loss rate identifies the percentage of scheduled uplink packet transmissions that are not successfully decoded by the serving base station during a discrete time interval of a monitoring period. In particular, uplink packet loss rates reflect instances in which an uplink packet transmitted by a mobile device cannot be decoded by a base station, as may typically result from poor coverage and/or high channel interference conditions. Low reference signal power levels may be indicative of poor coverage. Accordingly, reference signal power levels and interference levels may be KPIs that are monitored in conjunction with an uplink packet loss rate. Various parameters may be used to represent a reference signal power level, including a reference signal received power (RSRP) indicator, a received signal code power (RSCP) indicator, and a received signal strength indicator (RSSI). Likewise, a variety of different parameters may be used to determine an interference level, including a channel interference indicator, a channel quality indicator (CQI) and an Ec/Io indicator. In some networks, separate KPIs are monitored for different channels. For example, a network may monitor an RSRP and/or interference for a physical uplink control channel (PUCCH), as well as an RSRP and/or interference for a physical uplink shared channel (PUSCH), since different parameters may be adjusted to improve the corresponding performance metric on the PUCCH than on the PUSCH. Uplink packet loss rates may also reflect instances in which a mobile device fails to transmit an uplink packet over resources scheduled to carry the uplink packet, as may occur when the mobile device does not receive an uplink scheduling assignment transmitted by the serving base station. In LTE networks, a mobile device may fail to receive an uplink scheduling assignment when the mobile device is "sleeping" during a transmission time interval (TTI) over which the scheduling assignment is communicated, as well as when the mobile device is unable to demodulation a portion of the physical downlink control channel (PDCCH). Accordingly, TTI sleep rates and demodulation reference signal (DMRS) transmission rates may also be KPIs monitored in conjunction with an uplink packet loss rate.

Networks may monitor KQIs and KPIs as time series indicators. By themselves, a KQI and KPIs may appear to be random variables at each discrete time interval. However, when analyzed together, it is possible to determine relationships between a KQI and KPIs. In some embodiments, a network may rank KPIs based on their relationships to a KQI.

In a certain period of time, one or more KQIs and KPIs can be monitored. Time series of the one or more KQIs and KPIs can be collected and formed. The period of time to monitor one or more KQIs and KPIs is referred to as a monitoring period. The relationships between the one or more KQIs and KPIs can be determined. In certain cases, the relationships between KPIs can be determined. In certain cases, the relationships between KQIs can be determined. Based on the relationships, configuration parameters of the system where these KQIs and KPIs belong to can be adjusted. The adjusted configuration parameters are used to in the system during a subsequent period, or a subsequent time duration. The KQI and/or KPIs may or may not be monitored during the subsequent period. The subsequent period and the monitoring period may be the same length time periods, or different length time periods. The subsequent period may be following the monitoring period, or it may be starting at a time after the monitoring period, where the starting of the subsequent period may have a certain time gap from the ending of the monitoring period. The subsequent period can be an effective time window for the adjusted configuration parameters.

In one embodiment, one or multiple monitoring periods can be formed. A monitoring period may slide with a certain length of the period, or the length of the monitoring period may vary over the time. An initial monitoring period could be of a certain size or certain time window, such as a certain number of days, a certain number of weeks, etc. After the initial monitoring period, a new monitoring window or period could be a shift of the initial monitoring period, or a sliding window of the initial monitoring period. E.g., an initial monitoring period could be day 1 to day 21, and the configuration parameters can be adjusted on day 22. A new monitoring period could be day 2 to day 22, and the configuration parameters can be adjusted starting on day 23. Hence, in this example, the monitoring window, or the monitoring period is 21 days, and the adjusted configuration parameters can be used on the 22nd day right following the monitoring period. As the window is sliding, the effectiveness of the adjusted configuration parameters can last for one day in this example.

In another example, an initial monitoring period could be, e.g., from day 1 to day 21, and the configuration parameters can be adjusted on day 22. A new monitoring period can be day 1 to day 22, and the configuration parameters can be adjusted starting on day 23. Note that here the monitoring period is incrementally expanded, with all the observations and data collected in the history.

In another example, an initial monitoring period could be, e.g., from day 1 to day 21, and the adjusted configuration parameters can be effective starting on day 22. A new monitoring period can be day 3 to day 23 (or incrementally from day 1 to day 23), and the adjusted configuration parameters can be used starting on day 24. Note that this example gives certain step size of where to end a new monitoring period, i.e., how long the time window can be for adjusted configuration parameters to be effective. This example gives a duration of the effectiveness of the adjusted configuration parameters as two days. In another example, a monitoring period could be of the same length or the same duration as the duration of the effectiveness of the adjusted configuration parameters. In another example, the monitoring window could end at a first time instance, and the subsequent window for the adjusted parameters to be effective could star at a second time instance where there is a gap between the second time instance and the first time instance.

Embodiment methods robustly determine the relationship in-between two time series. Embodiment methods may also robustly determine, for the scenario of a degradation observed from a first level of time series, among one or multiple a second level of time series, which time series of the second level are contributing to the degradation of the first level of time series, and what are the ranks of these contributing second level of time series.

The robust relationships may be obtained, by creating one or multiple meaningful subsets of observations, where for each set of observations, one or multiple metric to measure the relationship are obtained. The one or multiple metric obtained over one or multiple sets of observations may then be smoothed to leverage the randomness.

The meaningful subsets of observations may be created using, for example, different degrees of degradation of the first level of time series. For instance, all the observations associated with a first level of degradation of the first level of time series can form a first subset of observations, all the observations associated with a second level of degradation of the first level of time series can form a second subset of observations, and so on. Alternatively, the meaningful subsets of the observations can be created using different degrees of degradation for the second level of time series, or a combination of the degradation of the first and the second level of time series.

Embodiments provided herein can be applied to different areas of data analytics. For example, one use case can be network performance analysis and optimization. The first level of time series can be one or multiple KQIs, and the second level of time series can be one or multiple KPIs.

Notation-wise, one or multiple levels of the time series can be denoted. Each level of the time series can consist of one or multiple time series. For example, a first level of time series can consist of one or multiple time series, and a second level of time series can consist of one or multiple time series.

The solutions in this disclosure can be applied to different areas of data analytics. For example, one use case can be network performance analysis and optimization. The first level of time series can be one or multiple KQIs, and the second level of time series can be one or multiple KPIs.

In one embodiment, a relationship in-between two time series is robustly determined. A first time series can be from a first level of time series. A second time series can be from a second level of time series. Or the first time series, and the second time series can be from a same level of time series. For example, they can both be from the second level of time series.

The robustness is obtained, by creating one or multiple meaningful (sub)sets of observations, where for each set of observations, one or multiple metrics to measure the relationship are obtained. The one or multiple metrics obtained over one or multiple sets of observations are then smoothed, to leverage the randomness.

The meaningful (sub)sets of the observations are created by, for example, the different degrees of the degradation of the first level of time series. For instance, all the observations associated with a first level of degradation of the first level of time series can form a first subset of observations, all the observations associated with a second level of degradation of the first level of time series can form a second subset of observations, and so on. The meaningful (sub)sets of the observations can alternatively created by, for example, the different degrees of the degradation of the second level of time series, or a combination of the degradation of the first and the second level of time series. The level of degradation can be captured in different ways. For example, it can be the value of the observation is below or higher certain threshold, or it can be the number of observations below or higher certain threshold is taking how much percentage among all the observations, and so on.

Denote the first time series $y\_t$ with observations $y\_t$, $t=1, 2, \ldots$, where t is the time index for the observations. Denote the second time series $x\_t$ with observations $x\_t$, $t=1, 2, \ldots$, where t is the time index for the observations. The two time series are with the same time indices. If some of the observations of $y\_t$ or $x\_t$ are of NA (not-available) value, the observations with NA values can be omitted. For example, if $y\_3$ is NA, but $x\_3$ is not NA, both $y\_3$ and $x\_3$ can be omitted.

The time series $y\_t$ and $x\_t$ can be normalized, or not necessarily normalized.

One method is to create (sub)sets of the observations based on the value of one of the time series (e.g., the first time series). A (sub)set of the observations, denoted as $T\_k$, where set $T\_k$ includes the time indices for which the observation of y is greater than a threshold $Th\_k$ can be, $$T\_k=\{t, t\in\{1, 2, \ldots,\}, \text{ where } y\_t>Th\_k\} \quad (Eq.\ 1)$$

Assume for the first time series, the degradation is that the bigger the value $y\_t$ is, the worse the performance is (the performance here can mean the situation, the system performance, the system situation, the system result, the system output, etc.). Then, (Eq. 1) gives subsets of the observations for different degradation levels of $Th\_k$. If the improvement is that the bigger the value $y\_t$ is, the better the performance is, then, (Eq. 1) gives subset of the observations for different improvement level of $Th\_k$. Note that a variation can be that $y\_t>=Th\_k$ in (Eq. 1). Another variation is that $y\_t<Th\_k$, or $y\_t<=Th\_k$ (if the smaller the value $y\_t$ is, the worse the performance is, then, this variation would give the subsets for different degradation level of $Th\_k$; or if the larger the value $y\_t$ is, the better the performance is, then this variation would give the subset for different improvement level of $Th\_k$). Another variation is a combination of one or multiple conditions, such as $y\_t>$ (or $>=$)$Th1\_k$, and $y\_t<$(or $<=$)$Th2\_k$ in (Eq. 1), where $Th1\_k<$ or $<=Th2\_k$. It is noted that there may be an upper bound of t, where the upper bound could be the total number of observations Num_obs, i.e., $t=1, 2, \ldots,$ Num_obs. Note that the combinations of the conditions may sometimes give a smaller number of observations in the created or formed (sub)set. Sometimes it may be needed to have the conditions at one-side like y_t> or >=Th_k to allow more observations in the created or formed (sub)set.

Then, a relationship can be found based on the new time series of y, y_{T_k} which consist of a subset (T_k) of the observations, and the new time series of x, x_{T_k} which also consist of a subset (T_k) of the observations. The relationship metric, for example, can be correlation, or the slope of a linear regression, or the slope of a localized regression, and so on, R1_k=cor (y_{T_k}, x_{T_k}) (Eq. 2), R2_k=slope (regression (y_{T_k}~x_{T_k})) (Eq. 3). The relationship indicators can be calculated according to these relationship metrics, for the (sub)sets of the time series, i.e., the sets {T_k} of the time intervals or time instances formed by certain conditions or criteria, Throughout the disclosure, relationship indicator is used as the term to indicate the relationship, and the relationship indicator is the quantized presentation of the relationship according to a certain relationship metric. For simplicity, notation-wise, relationship and relationship indicator are interchangeable unless explicitly described.

The correlation, can be, for example, using an inner product of the two time series, or the correlation coefficients, as follows, mean((y_{T_k}−mean_y_{T_k})*(x_{T_k}−mean_x_{T_k}))/(std(y_{T_k})*std(x_{T_k})), where mean( ) is the arithmetic mean, and std( ) is the standard deviation.

The following is an example of how to apply the above to a use case of wireless network (e.g., cellular network) performance analysis and optimization. In the use case, KQI can be, for example, the uplink packet loss. KPIs can be, for example, the PUCCH interference, PUSCH interference, PUCCH RSRP (rsrp), PUSCH rsrp, handover success rate, and so on.

As an example, linear regression can be used to find the slope of two time series (two vectors, each vector can be a time series of observations of KPI or KQI). Linear least squares regression is currently used, by calling function lm(y~x) in R package. The second coefficient of the linear fitting is the slope.

For the slope in-between KQI and KPI, in lm(y~x), y is a series of KQI observations, and x is a series of KPI observations. These observations can be of different sets, based on the different ways of selection (as stated below). a). Denote Threshold as the threshold to select the observations of KQI, where the observations>Threshold. Threshold value is in a set of e.g., [0.025, 0.020, 0.015, 0.010, 0.008, 0.007, 0.006, 0.005, . . . , 0.001, 0)., b) Form a time series of observations for KQI: y={KQIs: KQI_i>Threshold, for all i as time index of the observations}, c) Form a time series of observations for KPI, where KPIs share the same time indices with the KQIs which are above the Threshold: x={KPIs: KPI_i, where KQI_i>Threshold, for all i as time index of the observations}, d) Perform regression, for example, lm(y~x), and find the slope, respective to the Threshold., e) For each Threshold value in the set (e.g., [0.025, 0.020, 0.015, 0.010, 0.008, 0.007, 0.006, 0.005, . . . , 0.001, 0)), find a respective slope.

The following gives examples of the results, for KQI being the uplink packet loss rate, KPI being average (avg) PUSCH interference, average PUCCH interference, average PUCCH rsrp, average PUSCH rsrp, respectively. Slope_uvw means the slope of the regression for KQI and KPI, when the value of KQI observations>0.uvw, where uvw=025, 020, 015, . . . , 001, 000. Length_uvw means the length of the vector (or the subset of the time series observations) which is used in the regression to calculate the slope, when KQI>0.uvw. Length_uvw can also be interpreted as the number of observations of KQI (not including NA values) where KQI>0.uvw.

Tables 1-3 illustrate examples of relationship of KQI and respective KPIs in Cell 1 in a cellular wireless network. Based on the results in Tables 1-3, it can be seen that the trend of the slopes are robustly captured by using the relationships obtained by applying the different observations subset created according to different threshold of KQI>0.uvw.

TABLE 1

|  | Slope_025 | Length_025 | Slope_020 | Length_020 | Slope_015 | Length_015 | Slope_010 | Length_010 |
|---|---|---|---|---|---|---|---|---|
| Avg.PUSCH.interference | 0.412459 | 109 | 0.419354 | 118 | 0.426908 | 133 | 0.459256 | 160 |
| Avg.PUCCH.interference | 0.592421 | 109 | 0.603385 | 118 | 0.608506 | 133 | 0.641858 | 160 |
| Avg.PUCCH.rsrp | −0.86701 | 109 | −0.90759 | 118 | −0.97213 | 133 | −1.03702 | 160 |
| Avg.PUSCH.rsrp | −0.5323 | 109 | −0.57928 | 118 | −0.65859 | 133 | −0.72177 | 160 |

TABLE 2

|  | Slope_008 | Length_008 | Slope_007 | Length_007 | Slope_006 | Length_006 | Slope_005 | Length_005 |
|---|---|---|---|---|---|---|---|---|
| Avg.PUSCH.interference | 0.466336 | 169 | 0.472005 | 175 | 0.47531 | 183 | 0.480051 | 195 |
| Avg.PUCCH.interference | 0.649838 | 169 | 0.653451 | 175 | 0.647879 | 183 | 0.643737 | 195 |
| Avg.PUCCH.rsrp | −1.039 | 169 | −1.03628 | 175 | −0.99954 | 183 | −0.97195 | 195 |
| Avg.PUSCH.rsrp | −0.73378 | 169 | −0.75258 | 175 | −0.7671 | 183 | −0.77898 | 195 |

TABLE 3

|  | Slope_004 | Length_004 | Slope_003 | Length_003 | Slope_002 |
|---|---|---|---|---|---|
| Avg.PUSCH.interference | 0.484259 | 202 | 0.475957 | 220 | 0.470303 |
| Avg.PUCCH.interference | 0.645776 | 202 | 0.628105 | 220 | 0.617439 |

TABLE 3-continued

| | | | | | |
|---|---|---|---|---|---|
| Avg.PUCCH.rsrp | −0.97465 | 202 | −0.87976 | 220 | −0.83414 |
| Avg.PUSCH.rsrp | −0.79243 | 202 | −0.71811 | 220 | −0.7313 |

| | Length_002 | Slope_001 | Length_001 | Slope_000 | Length_000 |
|---|---|---|---|---|---|
| Avg.PUSCH.interference | 238 | 0.470927 | 256 | 0.469375 | 277 |
| Avg.PUCCH.interference | 238 | 0.600686 | 256 | 0.592582 | 277 |
| Avg.PUCCH.rsrp | 238 | −0.74513 | 256 | −0.71701 | 277 |
| Avg.PUSCH.rsrp | 238 | −0.64825 | 256 | −0.6081 | 277 |

Tables 4-6 illustrate more examples of relationship of KQI and respective KPIs in Cell 2 in a cellular wireless network. Based on the results in Tables 4-6, it can be seen that the trend of the slopes are robustly captured by using the relationships obtained by applying the different observations subset created according to different threshold of KQI>0.uvw. For example, Slope_002 value for KPI Avg.PUCCH.interference is negative, but Slope_000, Slope_001, Slope_003, Slope_004, . . . , Slope_008 are all positive, hence, Slope_002 can be regarded as a noise or a perturbation, and it can be regarded that the Slope is positive if the number of observations used for calculate the slope is no less than 40, or 30, as the large majority of the slopes obtained are positive. This enhanced the robustness of the KQI and KPI relationship discovery. If the method was not used, yet Slope_002, for example, was used to identify the KQI and KPI relationship, it would give the wrong result.

Num_obs)=1−$p_k$. A (sub)set of the observations, denoted as $S_k$, where set $S_k$ includes the time indices for which the observation of y is greater than a threshold $Th_k$ can be, $p_k=1-(Num_\{y_t>Th_k\}/Num\_obs)$ (Eq. 4), $Thx_k$: such that $(Num_\{x_t>Thx_k\}/Num\_obs)=1-p_k$ (Eq. 5), $S_k=\{t, t\in\{1, 2, \ldots Num\_obs\}$, where $y_t>Th_k$, $x_t>Thx_k\}$ (Eq. 6).

Assume for the first or the second time series, the degradation is that the bigger the value $y_t$ or $x_t$ is, the worse the performance is. Then, (Eq. 6) gives subsets of the observations for different degradation levels of $Th_k$ and $Thx_k$. If the improvement is that the bigger the value $y_t$ or $x_t$ is, the better the performance is, then, (Eq. 6) gives subset of the observations for different improvement level of $Th_k$ and $Thx_k$. Note that a variation can be that $y_t>=Th_k$, $x_t>=Thx_k$ in (Eq. 6). Another variation is that $y_t<Th_k$, $x_t<Thx_k$, or $y_t<=Th_k$, $x_t<=Thx_k$ (if the

TABLE 4

| | Slope_025 | Length_025 | Slope_020 | Length_020 | Slope_015 | Length_015 | Slope_010 | Length_010 |
|---|---|---|---|---|---|---|---|---|
| Avg.PUCCH.interference | −0.02506 | 16 | −0.11569 | 19 | −0.31934 | 28 | −0.21174 | 34 |
| Avg.PUSCH.rsrp | −0.00842 | 16 | −0.11242 | 19 | −0.32432 | 28 | −0.41834 | 34 |

TABLE 5

| | Slope_008 | Length_008 | Slope_007 | Length_007 | Slope_006 | Length_006 | Slope_005 | Length_005 |
|---|---|---|---|---|---|---|---|---|
| Avg.PUCCH.interference | 0.099565 | 40 | 0.02038 | 45 | 0.039453 | 53 | 0.091863 | 62 |
| Avg.PUSCH.rsrp | 0.000709 | 40 | −0.19705 | 45 | −0.25571 | 53 | −0.14086 | 62 |

TABLE 6

| | Slope_004 | Length_004 | Slope_003 | Length_003 | Slope_002 |
|---|---|---|---|---|---|
| Avg.PUCCH.interference | 0.104136 | 69 | 0.135869 | 88 | −0.02565 |
| Avg.PUSCH.rsrp | −0.06847 | 69 | −0.0233 | 88 | −0.33512 |

| | Length_002 | Slope_001 | Length_001 | Slope_000 | Length_000 |
|---|---|---|---|---|---|
| Avg.PUCCH.interference | 112 | 0.276001 | 201 | 0.087297 | 619 |
| Avg.PUSCH.rsrp | 112 | 0.204926 | 201 | 0.065454 | 619 |

Another method is to create (sub)sets of the observations based on the value of the first time series and the second time series. Let $Th_k$ as the $p_k$-percentile of $y_t$, t=1, 2, . . . , Num_obs, where there are (1−$p_k$) portion of the observations of $y_t>Th_k$ among all the observations of $y_t$, i.e., $p_k=1-(Num_\{y_t>Th_k\}/Num\_obs)$, where $Num_\{y_t>Th_k\}$ is the number of observations whose values are greater than $Th_k$. Denote $Thx_k$ as the $p_k$-percentile of $x_t$, i.e. $Thx_k$: such that $(Num_\{x_t>Thx_k\}/$ smaller the value $y_t$ or $x_t$ is, the worse the performance is, then, this variation would give the subsets for different degradation level of $Th_k$ and $Thx_k$; or if the larger the value $y_t$ or $x_t$ is, the better the performance is, then this variation would give the subset for different improvement level of $Th_k$ and $Thx_k$). Another variation is a combination of one or multiple conditions, such as $y_t>$ (or >=)$Th1_k$, $x_t>$ (or >=)$Thx1_k$, and $y_t<$(or <=)$Th2_k$, $x_t<$(or <=)$Thx2_k$ in (Eq. 6), where $Th1_k<$ or <=$Th2_k$, Thx1_k< or <=Thx2_k. Note that the combinations of the conditions may sometimes give a smaller number of observations in the created or formed (sub)set. Sometimes it may be needed to have the conditions at one-side like y_t> or >=Th_k, x_t> or >=Thx_k to allow more observations in the created or formed (sub)set. The relationship indicators can be calculated according to these relationship metric, for the (sub)sets of the time series, i.e., the sets {S_k} of the time intervals formed by certain conditions or criteria.

It is noted that if the degradation of y_t is in opposite direction of x_t, i.e., if y_t is of larger value, the worse performance is, but x_t is of smaller value, the worse performance is, then, we need to align the directions as follows: p_k=1-(Num_{y_t>Th_k}/Num_obs) (Eq. 4a), Thx_k: such that (Num_{x_t<Thx_k}/Num_obs)=1-p_k (Eq. 5a), S_k={t, t∈{1, 2, ... Num_obs}, where y_t>Th_k, x_t<Thx_k}(Eq. 6a) (if the time series of x_t is normalized, then, an alternative is to apply Eq. 4-6 to time series of 1-x_t).

There can be similar variations for Eq. 4a-6a, similar to the variations to Eq. 4-6 as described above.

Then, a relationship can be found based on the new time series of y, y_{S_k} which consist of a subset (S_k) of the observations, and the new time series of x, x_{S_k} which also consist of a subset (S_k) of the observations. The relationship metric, for example, can be correlation, or the slope of a linear regression, or the slope of a localized regression, and so on, R3_k=cor (y_{S_k}, x_{S_k}) (Eq. 7), R4_k=slope (regression (y_{S_k}~x_{S_k})) (Eq. 8), R5_k=Num_{S_k}/Num_{y_t>Th_k} (Eq. 9), R6_k=cor ((y_{S_k}-Th_k), (x_{S_k}-Thx_k)) (Eq. 10).

The correlation (function cor( )), can be, for example, using a inner product of the two time series, or the correlation coefficients, as follows, mean((y_{S_k}-mean_y_{S_k})*(x_{S_k}-mean_x_{S_k}))/(std (y_{S_k})*std(x_{S_k})), where mean( ) is the arithmetic mean, and std( ) is the standard deviation. In Eq. 9, it can be denoted as a hit-ratio, where a hit event can be identified as y_t>Th_k, x_t>Thx_k for observation time t. The hit-ratio indicates the percentage of how many events of hit there are among the observations where y_t>Th_k. It can be interpreted in some cases as the percentage to indicate the level of when the first time series is not good, the second time series is not good either, if the bigger the value of x or y is, the worse the performance is. Equation 10 gives a "hit-distance-correlation", where when x_t and y_t hit, the distance that exceeds the threshold of Thx_k and Th_k respectively, is used in the correlation.

It is noted that if the degradation of y_t is in opposite direction of x_t, i.e., if y_t is of larger value, the worse performance is, but x_t is of smaller value, the worse performance is, then, the results from Eq. 7-8, 10 would mostly be negative, and Eq. 9 may be reflecting the other portion (the good part) of the x_t to be hit on the bad part of y_t. To compare the results for other x_t which are along the same direction of degradation as y_t, we can do the following, if x_t is normalized: x'_{S_k}=1-x_{S_k}, R3_k=cor (y_{S_k}, x'_{S_k}) (Eq. 7a), R4_k=slope (regression (y_{S_k}~x'_{S_k})) (Eq. 8a), R5_k=Num_{S_k}/Num_{y_t>Th_k} where S_k is in Eq. 6a (Eq. 9a), R6_k=cor ((y_{S_k}-Th_k), (x'_{S_k}-Thx_k)), Thx_k in Eq. 5a (Eq. 10a).

The following provides examples of how to apply the above to a use case of wireless network (e.g., cellular network) performance analysis and optimization. In the use case, KQI can be, for example, the uplink packet loss. KPIs can be, for example, the average PUCCH interference, average PUSCH interference, average PUCCH rsrp, average PUSCH rsrp, handover success rate, and so on. Note that for rsrp related KPIs, the higher the value of KPI is, the better the performance is, hence we can apply equations (4a-10a); while for some non-rsrp related KPIs, such as the interference, the higher the value is, the worse the performance is (the worse the KQI is), hence, we can apply equations (4-10).

Throughout the disclosure, it is noted that the notation "non-rsrp related KPIs" or the like is meant to indicate in general, the KPIs which are along the same direction as KQI, i.e., when KPI is higher, KQI is also higher; or when KPI is larger or when KQI is higher, it impact the performance in the same direction (better or worse). It is interchangeable to the notation of KPIs with the same direction of KQI. the notation "rsrp-related KPIs" or the alike is meant to indicate in general, the KPIs which are along the opposite direction as KQI, i.e., when KPI is lower, KQI is higher; or when KPI is higher or when KQI is higher, it impacts the performance in the opposite direction (such as KPI higher gives better performance, KQI higher means lower performance). It is interchangeable to the notation of "KPIs with the opposite direction of KQI" or the like.

The most bad KQI or KPI is labeled as '1', while the others are labeled as other numbers, such as '2', '3', etc., depending on how many levels are set in labeling. No matter how many levels of the labels are, the most bad KQI or KPI is always labeled as '1', and remaining observations are labeled not as '1'.

For example, for 95%-tile for KQI in quantile method of labeling, the worst 5% of the observations (i.e., the 5% with highest packet loss) are labeled as '1'. For 85%-tile for KPI (non-rsrp related) in quantile method of labeling, the worst 15% of the observations (i.e., the 15% with highest observation values) are labeled as '1'. For 80%-tile for KPI (rsrp related: pucch.rsrp and pusch.rsrp) in quantile method of labeling, the worst 20% of the observations (i.e., the 20% with lowest observation values) are labeled as '1'.

For another example, for absolute-value threshold for KQI, e.g., 0.007, if the KQI observation is >0.007, then, this observation is labeled as '1'. Then, the percentage of how many observations of KQI is >0.007 among all the KQI observations in the cell is calculated, denoted as quantile_thr. For each KPI, then, the worst quantile_thr portion of the observations are also labeled as '1'. For example, if there are 500 total observations (non-NA) for KQI, and there are 200 observations>0.007. Then, quantile_thr=200/500=0.4. For KPI (non-rsrp related), 40% of the highest observations then are labeled as '1'. For KPI (rsrp-related), 40% of the lowest observations then are labeled as '1'.

A hit is defined as the event that when KQI's label is '1', the KPI's label is also '1' (this can be explained as a co-occurrence, as the KQI and KPI occur to be bad at the same time). The hit-ratio is defined as the ratio of the number of hits and the total number of KQI observations with label '1'. For example, there are in total 20 KQI observations with label '1', and for these 20 KQI observations, there are 5 hits for a KPI (i.e., for the 20 observations of the KPI that occur at the same time of the 20 KQI most bad observations (labeled as '1'), there are 5 observations of KPI with label '1', while the other 15 observations of KPI are not with label '1'). Then, for this KPI, the hit-ratio is 5/20=0.25.

As an example, linear regression can be used to find the slope of two time series (two vectors, each vector can be a time series of observations of KPI or KQI). Linear least squares regression is currently used, by calling function lm(y~x) in R package. The second coefficient of the linear fitting is the slope.

For the slope in-between KQI and KPI, in lm(y~x), y is a series of KQI observations, and x is a series of KPI observations. These observations can be of different sets, based on the different ways of selection (as stated below). a). Denote Threshold as the threshold to select the observations of KQI, where the observations>Threshold. Threshold value is in a set of e.g., [0.025, 0.020, 0.015, 0.010, 0.008, 0.007, 0.006, 0.005, . . . , 0.001]. For another example, the set of threshold values can be, 0.001, 0.002, . . . , 0.025, with stepsize 0.001; or with stepsize 0.002. b) Form a time series of observations for KQI: y={KQIs: KQI_i>Threshold, for all i as time index of the observations}, c) Calculate the percentage of how many observations of KQI are above the Threshold. Denote quantile_Threshold=(the number of KQI observations>Threshold)/(total number of KQI observations with non-NA values), d) For non-rsrp KPI: calculate the threshold of KPI (denoted as KPI_Threshold) such that the percentage of {KPI observations>KPI_Threshold} among {this KPI's non-NA observations} should equal to quantile_Threshold (the percentage obtained in step c for KQI). I.e., KPI_Threshold={KPI_Threshold: where (the number of KPI observations>KPI_Threshold)/(total number of KPI observations with non-NA values)}. For rsrp KPI: calculate the threshold of KPI (denoted as KPI_Threshold) such that the percentage of {KPI observations<KPI_Threshold} among {this KPI's non-NA observations} should equal to quantile_Threshold (the percentage obtained in step c for KQI). i.e., KPI_Threshold={KPI_Threshold: where (the number of KPI observations<KPI_Threshold)/(total number of KPI observations with non-NA values)}., e) For non-rsrp KPI: form a time series of observations for KPI, where KPIs share the same time indices with the KQIs which are above the Threshold, and also the observations of the KPI>Threshold_KPI: x={KPIs: KPI_i, where KPI_i>KPI_Threshold, KQI_i>Threshold, for all i as time index of the observations} For rsrp KPI: form a time series of observations for KPI, where KPIs share the same time indices with the KQIs which are above the Threshold, and also the observations of the KPI<Threshold_KPI: x={KPIs: KPI_i, where KPI_i<KPI_Threshold, KQI_i>Threshold, for all i as time index of the observations} f) For non-rsrp KPI, perform regression lm(y~x), and find the slope, respective to the Threshold.

For rsrp KPI, perform regression lm(y~x') where x'=1−x, and find the slope, respective to the Threshold. Note that here y and x are all normalized values. g) For each Threshold value in the set (e.g., [0.025, 0.020, 0.015, 0.010, 0.008, 0.007, 0.006, 0.005, . . . , 0.001)), find a respective slope. The following gives examples of the results, for KQI being the uplink packet loss rate, KPI being PUSCH interference, PUCCH interference, PUCCH rsrp, PUSCH rsrp, respectively. Slope_hit_uvw means the slope of the regression for KQI and KPI, when the value of KQI observations>0.uvw, and at the same time KPI>Thx_k where the threshold can be calculated as indicated as in Eq. 5 (for non-rsrp related KPIs), Eq. 5a (for rsrp related KPIs) for Th_k=0.uvw, where uvw=25, 20, 15, . . . , 01, 00. Length_hit_uvw means the length of the vector (or the subset of the time series observations) which is used in the regression to calculate the slope, when KQI>0.uvw and at the same time KPI>Thx_k. Length_hit_uvw can also be interpreted as the number of observations of KQI (not including NA values) where KQI>0.uvw and at the same time KPI>Thx_k (the KQI and KPI hit case, for non-rsrp KPIs), and similarly for rsrp related KPIs. Hitratio_uvw can be calculated as indicated in Eq. 9 (for non-rsrp related KPIs), Eq. 9a (for rsrp related KPIs) for Th_k=0.uvw, where hit-ratio indicates the percentage of how many events of hit (e.g., KQI>0.uvw=Th_k, KPI>Thx_k) there are among the observations KQI>0.uvw=Th_k).

Tables 7-11 illustrate examples of relationship of KQI and respective KPIs in Cell 1 in a cellular wireless network. Tables 7-9 illustrates the slope and corresponding length of the vectors to calculate the slope. Tables 10-11 illustrates the hit-ratio.

Based on the results in Tables 7-11, it can be seen that the trend of the slopes or the hit-ratio are robustly captured by using the relationships obtained by applying the different observations subset created according to different threshold of KQI>0.uvw.

TABLE 7

|  | Slope_hit_025 | Length_hit_025 | Slope_hit_020 | Length_hit_020 |
| --- | --- | --- | --- | --- |
| Avg.PUSCH.interference | 1.469351 | 86 | 1.110293 | 90 |
| Avg.PUCCH.interference | 1.543919 | 88 | 1.193083 | 96 |
| Avg.PUCCH.rsrp | 1.116738 | 3 | 1.097052 | 4 |
| Avg.PUSCH.rsrp | 0.628394 | 15 | 0.714526 | 21 |
|  | Slope_hit_015 | Length_hit_015 | Slope_hit_010 | Length_hit_010 |
| Avg.PUSCH.interference | 0.724056 | 102 | 0.547622 | 124 |
| Avg.PUCCH.interference | 0.941317 | 111 | 0.840062 | 137 |
| Avg.PUCCH.rsrp | 0.969201 | 11 | 0.637568 | 36 |
| Avg.PUSCH.rsrp | 0.664271 | 34 | 0.541693 | 58 |

TABLE 8

|  | Slope_hit_008 | Length_hit_008 | Slope_hit_007 | Length_hit_007 |
| --- | --- | --- | --- | --- |
| Avg.PUSCH.interference | 0.539024 | 133 | 0.536473 | 140 |
| Avg.PUCCH.interference | 0.817543 | 145 | 0.807757 | 151 |
| Avg.PUCCH.rsrp | 0.485206 | 51 | 0.350246 | 63 |
| Avg.PUSCH.rsrp | 0.511452 | 67 | 0.392292 | 76 |

TABLE 8-continued

|  | Slope_hit_006 | Length_hit_006 | Slope_hit_005 | Length_hit_005 |
|---|---|---|---|---|
| Avg.PUSCH.interference | 0.536934 | 145 | 0.5257 | 156 |
| Avg.PUCCH.interference | 0.791165 | 158 | 0.776795 | 166 |
| Avg.PUCCH.rsrp | 0.186208 | 76 | 0.081757 | 100 |
| Avg.PUSCH.rsrp | 0.35861 | 87 | 0.338261 | 103 |

TABLE 9

|  | Slope_hit_004 | Length_hit_004 | Slope_hit_003 | Length_hit_003 |
|---|---|---|---|---|
| Avg.PUSCH.interference | 0.528379 | 166 | 0.513264 | 189 |
| Avg.PUCCH.interference | 0.761029 | 176 | 0.734724 | 195 |
| Avg.PUCCH.rsrp | 0.014227 | 114 | −0.16361 | 147 |
| Avg.PUSCH.rsrp | 0.322725 | 115 | 0.120024 | 148 |

|  | Slope_hit_002 | Length_hit_002 | Slope_hit_001 | Length_hit_001 |
|---|---|---|---|---|
| Avg.PUSCH.interference | 0.504663 | 207 | 0.498443 | 231 |
| Avg.PUCCH.interference | 0.712566 | 213 | 0.688147 | 235 |
| Avg.PUCCH.rsrp | −0.29173 | 183 | −0.3647 | 219 |
| Avg.PUSCH.rsrp | −0.05045 | 184 | −0.28417 | 219 |

TABLE 10

|  | Hitratio_025 | Hitratio_020 | Hitratio_015 | Hitratio_010 | Hitratio_008 | Hitratio_007 |
|---|---|---|---|---|---|---|
| Avg.PUSCH.interference | 0.788991 | 0.762712 | 0.766917 | 0.775 | 0.786982 | 0.8 |
| Avg.PUCCH.interference | 0.807339 | 0.813559 | 0.834586 | 0.85625 | 0.857988 | 0.862857 |
| Avg.PUCCH.rsrp | 0.027523 | 0.033898 | 0.082707 | 0.225 | 0.301775 | 0.36 |
| Avg.PUSCH.rsrp | 0.137615 | 0.177966 | 0.255639 | 0.3625 | 0.39645 | 0.434286 |

TABLE 11

|  | Hitratio_006 | Hitratio_005 | Hitratio_004 | Hitratio_003 | Hitratio_002 | Hitratio_001 |
|---|---|---|---|---|---|---|
| Avg.PUSCH.interference | 0.79235 | 0.8 | 0.821782 | 0.859091 | 0.869748 | 0.902344 |
| Avg.PUCCH.interference | 0.863388 | 0.851282 | 0.871287 | 0.886364 | 0.894958 | 0.917969 |
| Avg.PUCCH.rsrp | 0.415301 | 0.512821 | 0.564356 | 0.668182 | 0.768908 | 0.855469 |
| Avg.PUSCH.rsrp | 0.47541 | 0.528205 | 0.569307 | 0.672727 | 0.773109 | 0.855469 |

Tables 12-16 illustrate examples of relationship of KQI and respective KPIs in Cell 2 in a cellular wireless network. Tables 12-14 illustrates the slope and corresponding length of the vectors to calculate the slope. Tables 15-16 illustrates the hit-ratio.

Based on the results in Tables 12-14, it can be seen that the trend of the slopes are robustly captured by using the relationships obtained by applying the different observations subset created according to different threshold of KQI>0.uvw. For example, it can be seen that the slopes calculated in hit-case when the length of the vectors used to calculate the slope is very small may not be reliable enough, so for the purpose of robustness, these slopes may not be considered, or they should be ignored. The slopes calculated in hit-case when the length of the vectors used to calculate the slope are not small (e.g., greater than 20) can be good, so for the purpose of robustness, they can be considered, such as Slope_hit_002, Slope_hit_001.

TABLE 12

|  | Slope_hit_025 | Length_hit_025 | Slope_hit_020 | Length_hit_020 |
|---|---|---|---|---|
| Avg.PUCCH.interference | NA | 0 | NA | 1 |
| Avg.PUSCH.rsrp | NA | 0 | NA | 0 |

TABLE 12-continued

|  | Slope_hit_015 | Length_hit_015 | Slope_hit_010 | Length_hit_010 |
|---|---|---|---|---|
| Avg.PUCCH.interference | −16.7928 | 2 | −6.38126 | 4 |
| Avg.PUSCH.rsrp | NA | 0 | NA | 0 |

TABLE 13

|  | Slope_hit_008 | Length_hit_008 | Slope_hit_007 | Length_hit_007 |
|---|---|---|---|---|
| Avg.PUCCH.interference | −4.322 | 5 | −4.322 | 5 |
| Avg.PUSCH.rsrp | −53.8396 | 2 | 17.29254 | 3 |

|  | Slope_hit_06 | Length_hit_006 | Slope_hit_005 | Length_hit_005 |
|---|---|---|---|---|
| Avg.PUCCH.interference | 2.326518 | 9 | 2.326518 | 9 |
| Avg.PUSCH.rsrp | 11.5704 | 4 | 6.522821 | 6 |

TABLE 14

|  | Slope_hit_004 | Length_hit_004 | Slope_hit_003 | Length_hit_003 |
|---|---|---|---|---|
| Avg.PUCCH.interference | 1.11947 | 11 | 1.006237 | 14 |
| Avg.PUSCH.rsrp | 5.543438 | 7 | 8.098319 | 8 |

|  | Slope_hit_002 | Length_hit_002 | Slope_hit_001 | Length_hit_001 |
|---|---|---|---|---|
| Avg.PUCCH.interference | −0.01841 | 25 | −0.45104 | 50 |
| Avg.PUSCH.rsrp | −0.07161 | 22 | 0.2709 | 51 |

Based on the results in Tables 15-16, it can be seen that the trend of the hit-ratio are robustly captured by using the relationships obtained by applying the different observations subset created according to different threshold of KQI>0.uvw. For example, all the Hitratio_020, . . . , Hitratio_002 indicate that KPI Avg.PUCCH.interference has higher hit-ratio with KQI than the hit-ratio of KPI Avg.PUSCH.rsrp with KQI, but Hitratio_001 indicates otherwise. According to the trend of majority, it should be disregarded that Hitratio_001 indicates. Hence, this method provides a robust relationship discovery for KQI and respective KQIs.

observations are then smoothed, to leverage the randomness.

The following is an example of how to apply the above to a use case of wireless network (e.g., cellular network) performance analysis and optimization. In the use case, KQI can be, for example, the uplink packet loss. KPIs can be, for example, the average PUCCH interference, average PUSCH interference, average PUCCH rsrp, average PUSCH rsrp, handover success rate, and so on.

The following shows an example of how to smooth the relationships obtained by the multiple subsets of observations.

TABLE 15

|  | Hitratio_025 | Hitratio_020 | Hitratio_015 | Hitratio_010 | Hitratio_008 | Hitratio_007 |
|---|---|---|---|---|---|---|
| Avg.PUCCH.interference | 0 | 0.052632 | 0.071429 | 0.117647 | 0.125 | 0.111111 |
| Avg.PUSCH.rsrp | 0 | 0 | 0 | 0 | 0.05 | 0.066667 |

TABLE 16

|  | Hitratio_006 | Hitratio_005 | Hitratio_004 | Hitratio_003 | Hitratio_002 | Hitratio_001 |
|---|---|---|---|---|---|---|
| Avg.PUCCH.interference | 0.169811 | 0.145161 | 0.15942 | 0.159091 | 0.223214 | 0.248756 |
| Avg.PUSCH.rsrp | 0.075472 | 0.096774 | 0.101449 | 0.090909 | 0.196429 | 0.253731 |

As a further step of determining the relationships robustly, after creating one or multiple meaningful (sub)sets of observations, where for each set of observations, one or multiple metrics to measure the relationship are obtained, the one or multiple metrics obtained over one or multiple sets of observations are then smoothed, to leverage the randomness.

a) For slopes obtained with KQI threshold method, average out the slopes. Slope_Thr is a set of slopes obtained when the Threshold for non-hit case is greater or equals to Thr. Note that non-hit case means the observations are obtained by KQI threshold, hit-case means the observations are obtained by when KQI and KPI hit. Ave_slope_Thr is the mean value or the average value of slope_Thr., slope_Thr={slope: Threshold>Thr}, ave_slope_Thr=mean (slope_Thr), where Thr can be, e.g., 0.005, 0.003, 0.001, 0.000. Note that the average value can be calculated by excluding a max and a min value, to avoid the effect of being affected by a too big or too small value. And the slope is included to calculate the average only if the length of the vector (x or y) in the regression is greater than a certain threshold (e.g., 30) (to get a meaningful slope based on regression, to avoid overfitting problem).

b) For slopes obtained with KQI threshold method (KQI-KPI hit case), average out the slopes. Slope_hit_Thr is a set of slopes obtained when the Threshold is greater or equals to Thr. Ave_slope_hit_Thr is the mean value of slope_Thr., slope_hit_Thr={slope: Threshold>Thr}, ave_slope_hit_Thr=mean (slope_hit_Thr), where Thr can be, e.g., 0.005, 0.003, 0.001. Note that the slope is included to calculate the average only if the length of the vector (x, x' or y) in the regression for hit case is greater than a certain threshold (e.g., 20) (to get a meaningful slope based on regression, to avoid overfitting problem).

Regarding the threshold of the length of vectors (the number of observations) related to whether a slope would be included in the average slope calculation, i.e., whether a slope would be meaningful, to avoid overfitting problem, a fixed threshold may apply (such as 30 for non-hit case, and 20 for hit case as above). Another approach can be to check the prediction power, such as the R-square, or other metric. for example, if R-square is larger than a certain threshold, then, the slope is meaningful.

Alternatively, a mechanism to verify is to use the correlation coefficient calculated using the vectors (with the selected or the subset of the observations) which are used to calculate the slope of the regression. To check whether the calculated correlation is reliable or not, we can check whether we have sufficient number of samples for the correlation. There is a formula to calculate the sample size required to determine whether a correlation coefficient is significantly different from zero: $N=[(Z_\alpha+Z_\beta)/C]^2+3$; where: N=total number of samples required, $Z_\alpha$=The standard normal deviate for α (we called Z value for α), $Z_\beta$=The standard normal deviate for β (we called Z value for β), α=expected type I error rate, β=expected type II error rate, C=0.5*ln [(1+r)/(1−r)], r=correlation coefficient, Type I error rate is the incorrect rejection of a true null hypothesis (false positive), Type II error rate is the failure to reject a false null hypothesis (false negative).

The following shows an example of how to further determine the relationship robustly. It determines the sign of the slope and whether the slope sign agrees or not.

a) Obtain the slope sign according to majority vote. The vote is performed on the already smoothed slopes (averaged out slopes).

b) Determine whether the slope sign agrees or not. Currently in the algorithm, if all signs agree, or only one sign is different from all the other remaining signs of the slopes, it is regarded as 'agree' (marked as '1' for slope_sign_agree). Otherwise, it is not sure (marked as '0' slope_sign_agree).

If sign agrees, slope sign is positive, it means very much correlated. If sign agrees but slope sign is negative, it means not related. If sign does not agree, it means the relationship does not very surely stated. (Filter out KPI with the negative slope, especially the one with slope sign agreed.) The positive slope means that if KPI is improved, KQI will be improved as well. The larger the positive slope value is, the faster the KQI can be improved for a given amount of normalized KPI being improved. The negative slope means that if KPI is improved, KQI would not be improved. The larger the negative slope value is, the faster the KQI may be deteriorated for a given amount of normalized KPI being improved.

Table 17 illustrates examples of smoothed relationship of KQI and respective KPIs in Cell 1. In Table 17, it can be seen that the relationship in-between KQI and KPI Avg-.PUSCH.interference is indicated by consistently positive average slopes, so does KPI Avg.PUCCH.interference. It means if PUCCH.interference or PUSCH.interference is improved, the KQI can be improved. The relationship in-between KQI and KPI Avg.PUCCH.rsrp is indicated by a negative average slope sign, and the slope signs do not agree (in this example, 3 are positive and 4 are negative). Similar situation is for KPI Avg.PUSCH.rsrp. It means even if PUCCH.rsrp or PUSCH.rsrp is improved, the KQI may not be improved.

TABLE 17

|  | Ave_slp_000 | Ave_slp_001 | Ave_slp_003 | Ave_slp_005 | Ave_slp_hit_001 |
|---|---|---|---|---|---|
| Avg.PUSCH.interference | 0.462344 | 0.461641 | 0.459397 | 0.453195 | 0.606641 |
| Avg.PUCCH.interference | 0.625435 | 0.628721 | 0.633635 | 0.632534 | 0.837604 |
| Avg.PUCCH.rsrp | −0.93582 | −0.95701 | −0.98559 | −1.00338 | 0.094615 |
| Avg.PUSCH.rsrp | −0.71186 | −0.72338 | −0.73299 | −0.72676 | 0.355431 |

|  | Ave_slp_hit_003 | Ave_slp_hit_005 | Slp_sign | Slp_sign_agr |
|---|---|---|---|---|
| Avg.PUSCH.interference | 0.63106 | 0.665734 | 1 | 1 |
| Avg.PUCCH.interference | 0.866094 | 0.898488 | 1 | 1 |
| Avg.PUCCH.rsrp | 0.223529 | 0.340553 | −1 | 0 |
| Avg.PUSCH.rsrp | 0.447044 | 0.493664 | −1 | 0 |

Table 18 illustrates examples of smoothed relationship of KQI and respective KPIs in Cell 2. In Table 18, it can be seen that the relationship in-between KQI and KPI Avg-.PUSCH.interference is indicated by positive average slope sign, and the slope signs agree (in this example, 4 are positive, one is negative, and the other 2 are NA which means the average slope could not be obtained, e.g., due to the length of the vector to calculate the slope is not long enough (e.g., less than 20 observations), hence overall (majority law or rule) the signs agree by removing the randomness). It means if PUCCH.interference is improved, the KQI can be improved. The relationship in-between KQI and KPI Avg.PUSCH.rsrp is indicated by a negative average slope sign, and the slope signs agree (in this example, 4 are negative, one is positive, and the other 2 are NA which means the average slope could not be obtained, e.g., due to the length of the vector to calculate the slope is not long enough (e.g., less than 20 observations)). It means even if PUSCH.rsrp is improved, the KQI may not be improved.

TABLE 18

|  | Ave_slp_000 | Ave_slp_001 | Ave_slpe_003 | Ave_slp_005 | Ave_slp_hit_001 |
|---|---|---|---|---|---|
| Avg.PUCCH.interference | 0.069114 | 0.066517 | 0.071079 | 0.050565 | −0.23472 |
| Avg.PUSCH.rsrp | −0.11929 | −0.14569 | −0.13708 | −0.19787 | 0.099645 |

|  | Ave_slp_hit_003 | Ave_slp_hit_005 | Slp_sign | Slp_sign_agr |
|---|---|---|---|---|
| Avg.PUCCH.interference | NA | NA | 1 | 1 |
| Avg.PUSCH.rsrp | NA | NA | −1 | 1 |

For another example, we can look at the slope when KQI threshold is 0.000, 0.001, 0.002 (e.g., we could also use the slope when KQI is 0.000, or the average of the slopes when KQI threshold is 0.000, 0.001, or the average of the slopes when KQI threshold is 0.000, 0.001, 0.002, 0.003 . . . ), for non-hit case. Then, we can calculate an average of the slopes when KQI threshold is 0.000, 0.001, 0.002. If the average slope is positive, then, it should be kept in the root cause list; if the average slope is negative, then, it should be removed from the root cause list.

For another example, in the slope_sign calculation, we include the slope when KQI threshold is 0.000 (e.g., we could also use slopes when KQI threshold is 0.000 and 0.001, or slopes when KQI threshold is 0.000, 0.001, 0.002). To calculate the slope_sign, in the example of Table 17-18, we used 7 average slopes (3 for hit-case, 4 for non-hit case in Table 17-18), but now we use 7+1 (adding the slope when KQI threshold is 0.000), or we use 7+2 (adding the slope when KQI threshold is 0.000, 0.001), or use 7+1 (adding the average slope when KQI threshold is 0.000 and 0.001), or similar other examples.

For another example, in the average slope calculation, we can average the slopes when KQI threshold is (0.000, 0.001), (0.000, 0.001, 0.002), (0.000, 0.001, 0.002, 0.003), . . . , (0.000, . . . 0.007), (0.000, . . . , 0.008), . . . , respectively. This will reverse the calculation of the average slope as in example of Table 17-18 (coming from higher KQI threshold, then, adding more and more slopes when KQI threshold is lower), i.e., it can start from the slope from the lower KQI threshold, and add more and more slopes when KQI threshold becomes higher). This example can give more weight to the slopes when KQI threshold is lower, for non-hit case.

In one embodiment, for one or multiple time series of a first level, and one or multiple time series of a second level, a relationship w.r.t which time series of the second level would be of more importance for the degradation of a first level time series is robustly determined. The relationship can be, for example, measured by a list of the time series of the second level, sorted or ordered or ranked by an importance score or indicator of the respective time series of the second level, w.r.t the time series of the first level. The importance score or indicator can be, for example, the relationship(s) identified in previous embodiment (such as correlation, slope, hit-ratio, hit-distance-correlation, etc.), or their combinations (such as weighted sum, or a sequential sort/order/rank of these relationships (such as ranking the correlation first, then ranking the slope, etc.)).

The following shows example(s) of how to apply the above to a use case of wireless network (e.g., cellular network) performance analysis and optimization. In the use case, KQI can be, for example, the uplink packet loss. KPIs can be, for example, the average PUCCH interference, average PUSCH interference, average PUCCH rsrp, average PUSCH rsrp, handover success rate, and so on.

In an example, the value of the hit-ratio or averaged hit-ratio w.r.t. to different thresholds Th_k when KQI>Th_k and KPI>Thx_k as in Eq. 5 for non-rsrp related KPIs, or when KQI>Th_k and KPI<Thx_k as in Eq. 5a for rsrp related KPIs, can be used to sort or rank which KPI is more important to KQI's improvement, or which KPI is more important factor contributing to the degradation of KQI. The value of hit-ratio or averaged hit-ratio can indicate when KQI gets into problem (KQI bad), which KPI(s) are also getting into bad regime in its distribution.

Figure 8:
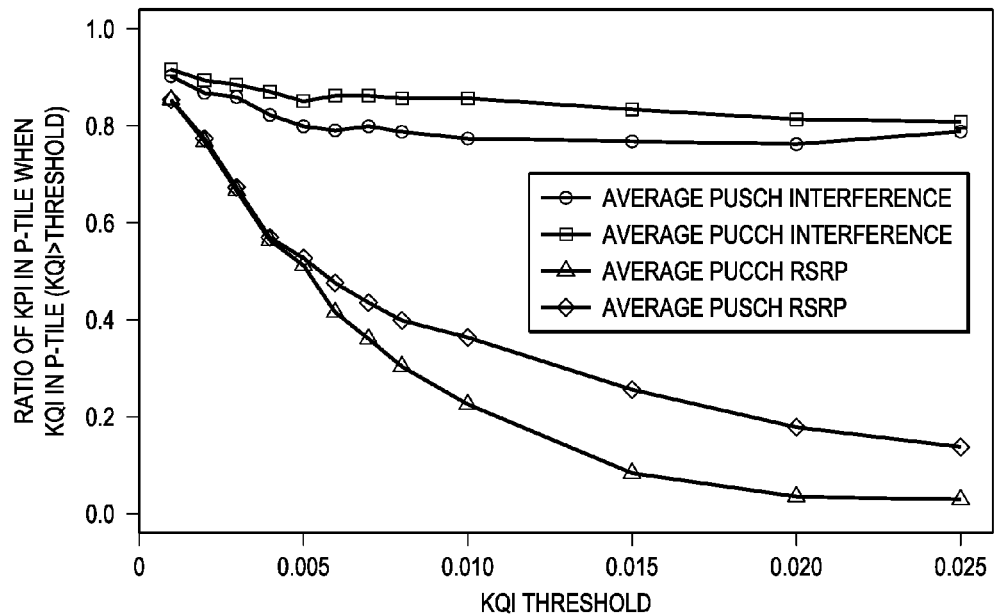
FIG. 8 illustrates a graph of simulation results.

FIG. 8 illustrates a graph of hit ratios for average interference levels and RSRP levels PUSCH and PUCCHs for different packet loss thresholds. The higher the ratio is for a particular KPI, the higher chance that this KPI is contributing to the KQI's degradation or improvement. In the example depicted in FIG. 8, interference on the PUCCH has the strongest relationship with packet loss, and interference on the PUSCH has the second strongest relationship with packet loss. RSRP levels on the PUSCH and the PUCCH have relatively weak relationships with packet loss.

Figure 9:
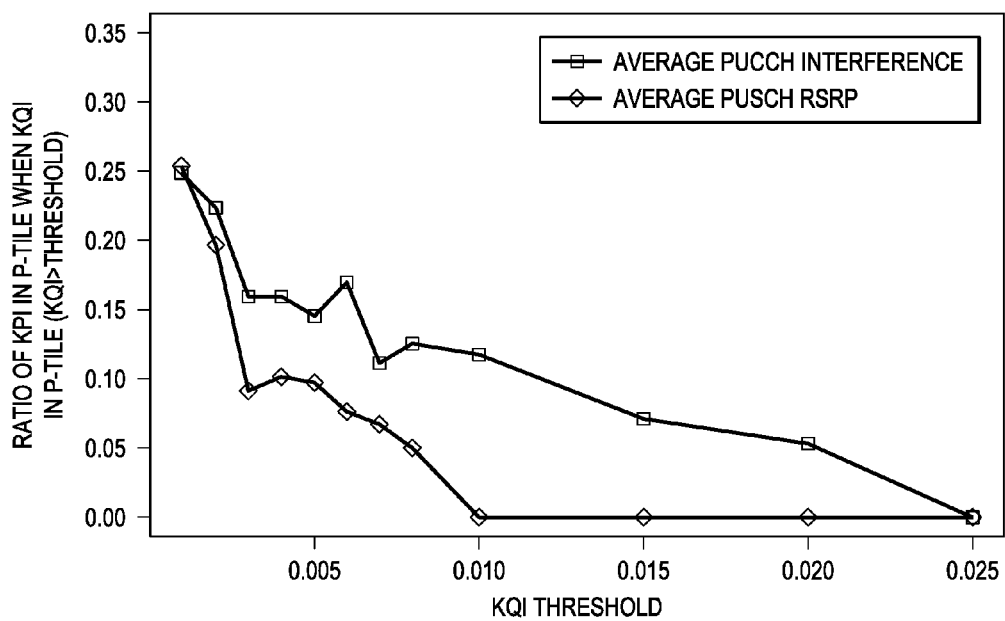
FIG. 9 illustrates another graph of simulation results

FIG. 9 shows for Cell 2, when KQI is in p-percentile (when KQI>Threshold), what is the portion or the ratio that the KPI is also in the KPI's p-percentile, according to different KQI's Threshold as shown in horizontal axis. This figure is based on Tables 15-16. The higher the ratio is for a particular KPI, the higher chance that this KPI is contributing to the KQI's degradation or improvement. Based on FIG. 9, Avg.PUCCH.interference is a factor impacting KQI in this cell. PUSCH.rsrp does not seem to a factor to impact KQI.

In another example, the values of the slopes or averaged slope values of the regressions of KQI and respective KPIs w.r.t. to different thresholds Th_k when KQI>Th_k and KPI>Thx_k as in Eq. 5 for non-rsrp related KPIs, or when KQI>Th_k and KPI<Thx_k as in Eq. 5a for rsrp related KPIs, can be used to sort or rank which KPI is more important to KQI's improvement, or which KPI is more important factor contributing to the degradation of KQI, or which KPI is more important factor to impact KQI. The value of the slopes indicate how fast the KQI can be improved when a particular KPI is improved, or how sensitive is KQI's improvement to the KPI's improvement.

Figure 10:
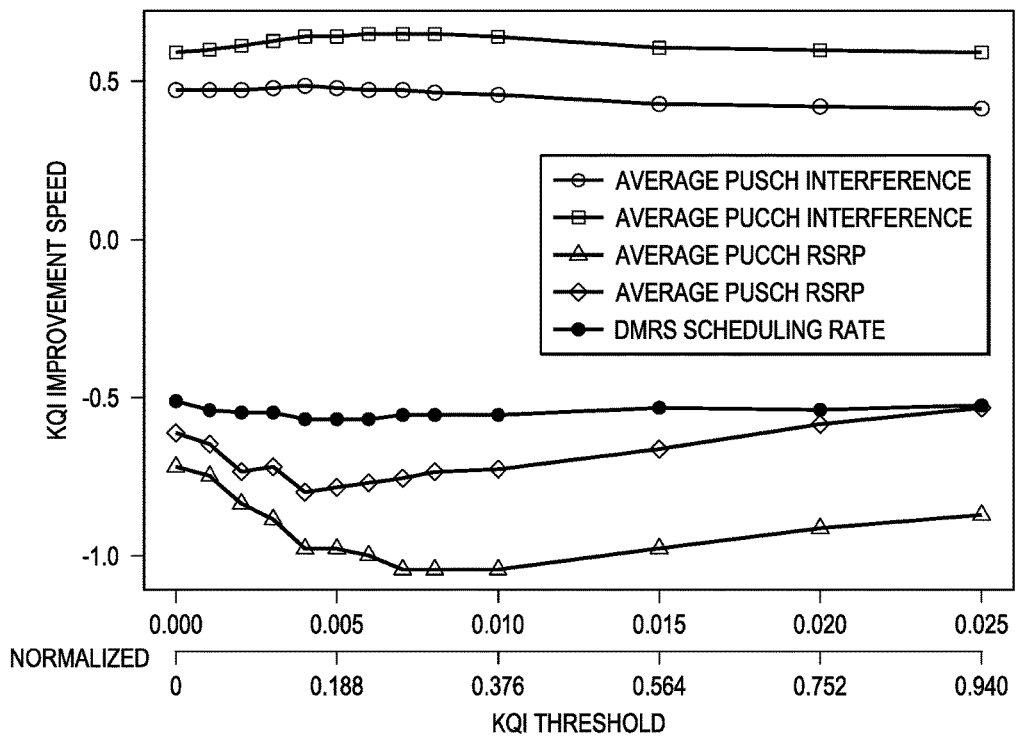
FIG. 10 illustrates yet another graph of simulation results.

FIG. 10 shows for Cell 1, when KQI>Threshold, what is the KQI's improvement speed, which can be captured as the slope of the regression of the KQI and KPI observations corresponding to KQI>Threshold, according to different KQI's Thresholds as shown in horizontal axis. This figure is based on Tables 1-3. The higher the KQI improvement speed, the faster the KQI can improve per unit (normalized) KPI improvement. Based on FIG. 10, Avg.PUCCH.interference is the major factor impacting KQI in this cell, and PUSCH.interference is the second major factor. PUCCH.rsrp and PUSCH.rsrp do not seem to be major factor to impact KQI.

Figure 11:
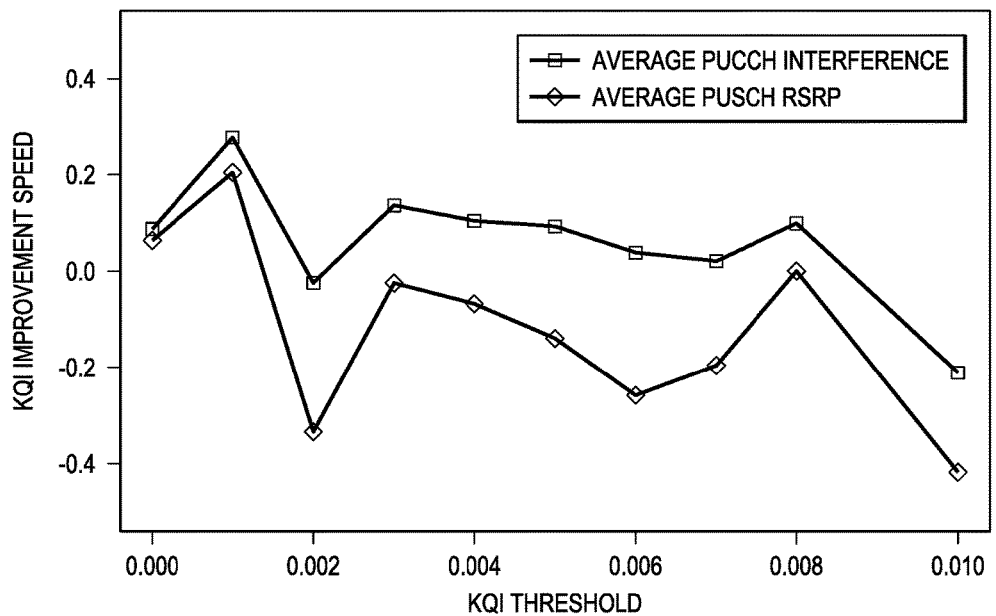
FIG. 11 illustrates yet another graph of simulation results.

FIG. 11 shows for Cell 2, when KQI>Threshold, what is the KQI's improvement speed, which can be captured as the slope of the regression of the KQI and KPI observations corresponding to KQI>Threshold, according to different KQI's Thresholds as shown in horizontal axis. This figure is based on Tables 4-6. The higher the KQI improvement speed, the faster the KQI can improve per unit (normalized) KPI improvement. The figure plots the results where the length of the vectors used in regression is greater than 30, and the results are disregarded if the length of the vectors used in regression is below 30.

Based on FIG. 11, Avg.PUCCH.interference is a factor impacting KQI in this cell. PUSCH.rsrp does not seem to be a factor to impact KQI.

As an extension of the embodiment, for certain time series of the second level (maybe not all the time series of the second level), to further sort or rank the importance or the degree of the impact to a time series of the first level, an additional way to create the (sub)set of the observations of a time series of the second level and a time series of the first level to calculate the relationships can apply. This additional way may be same or different from the way that are used to create the (sub)set of the observations of time series for the purpose of calculate the relationship in-between a time series of the second level and a time series of the first level, and sort or rank all the time series of the second level based on the relationship values.

For example, for all the time series of the second level, equations mentioned in previous embodiments can apply. For a subset of the time series of the second level, to further compare which time series is more important factor impacting the time series of the first level, other equations may apply. For example, a (sub)set $R\_k$ ($k=1, 2, \ldots, K$, where K is the total number of (sub)sets) of observations can be created, for a time series $y\_t$ of the first level, a time series $x\_t$ of the second level, $R\_k=\{t, t\in\{1, 2, \ldots,\}$, where $y\_t>Th\_k$, and $x\_t>Thrhdx\_k\}$ (Eq. 11) where $Thrhdx\_k$ is not necessarily calculated in the way of calculating $Thx\_k$ as in Eq. 5 or Eq. 5a.

For example, $Thrhdx\_k$ can be a fixed value or preconfigured value. Or $Thrhdx\_k$ can be set according to certain given or preconfigured percentile value for the time series $x\_t$ (e.g., according to 80-percentile, or 85-percentile, etc.). Similar can apply for $Th\_k$, e.g., fixed value, or preconfigured value, or set according to certain given or preconfigured percentile value, and so on.

The following shows example(s) of how to apply the above to a use case of wireless network (e.g., cellular network) performance analysis and optimization. In the use case, KQI can be, for example, the uplink packet loss. KPIs can be, for example, the average PUCCH interference, average PUSCH interference, and so on.

Figure 12:
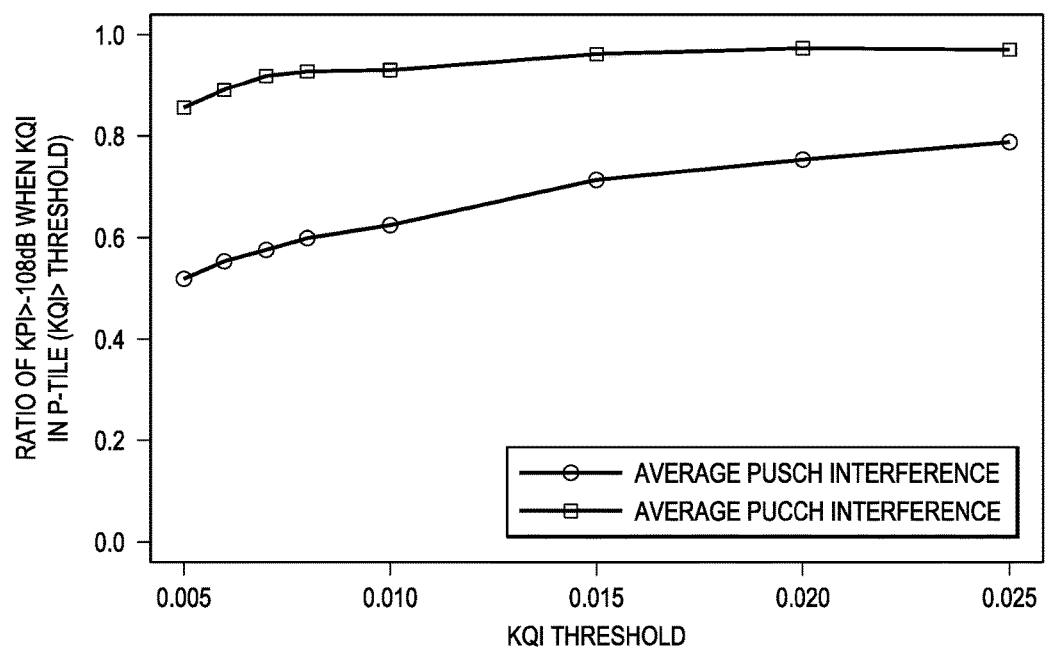
FIG. 12 illustrates yet another graph of simulation results.

FIG. 12 shows in Cell1, when KQI is in p-percentile (when KQI>Threshold), what is the portion or the ratio that the KPI average PUCCH interference or KPI average PUSCH interference is >−108 dB (this applies for interference related KPI), according to different level of Threshold for KQI as indicated on x-axis.

The higher the ratio is for a particular KPI, the higher chance that this KPI impacts the KQI. In this example, PUCCH interference is impacting more on KQI.

In one embodiment, the relationship among time series of a second level can be robustly calculated, where the relationship calculation can be based on the (sub)sets created by applying conditions on a time series of a first level, or conditions on the time series of the second level, or the combinations.

The subsets for two time series of a second level can be formed to satisfy a same set of conditions, or different set of conditions. These conditions can be as those mentioned in previous embodiments, such as those in Eq. 1, 4-6, 4a-6a, 11, and so on.

The calculation of the relationship can be also similar to those mentioned in previous embodiments, such as correlation, slope, hit-ratio, hit-distance ratio, and so on.

The following illustrates example(s) of how to apply the above to a use case of wireless network (e.g., cellular network) performance analysis and optimization. In the use case, KQI can be, for example, the uplink packet loss. KPIs can be, for example, the average PUCCH interference, average PUSCH interference, average PUCCH rsrp, average PUSCH rsrp, handover success rate, and so on.

For a first KPI (KPI^A) and a second KPI (KPI^B) to have regression (or correlation), for simplicity, we look at the non-hit case. The formation of the time series is similar to that in Slope in previous embodiment. a). Denote Threshold as the threshold to select the observations of KQI, where the observations>Threshold. Threshold value is in a set of e.g., [0.025, 0.020, 0.015, 0.010, 0.008, 0.007, 0.006, 0.005, . . . , 0.001, 0). b) Form a time series of observations for KPI^A, where KPI^As share the same time indices with the KQIs which are above the Threshold: $x=\{KPI^A s:$ $KPI^A\_i$, where $KQI\_i>Threshold$, for all i as time index of the observations$\}$ b) Form a time series of observations for KPI^B, where KPI^Bs share the same time indices with the KQIs which are above the Threshold: $y=\{KPI^B s: KPI^B\_i$, where $KQI\_i>Threshold$, for all i as time index of the observations$\}$ d) Perform regression $lm(y\sim x)$, and find the slope, respective to the Threshold. e) For each Threshold value in the set (e.g., [0.025, 0.020, 0.015, 0.010, 0.008, 0.007, 0.006, 0.005, . . . , 0.001, 0)), find a respective slope. (note that in current program we have not done for all the Thresholds in the above set. We only have calculated a set of [0.015, 0.007, 0.003, 0.001]).

The following gives examples of the results, for KQI being the uplink packet loss rate, KPI being average PUCCH interference, average PUCCH rsrp, downlink PDSCH discontinuous transmission rate (DL.PDSCH.DTX.rate), respectively. Slope_pucch_rsrp_uvw means the slope of the regression for KPI DL.PDSCH.DTX.rate and KPI Avg.PUCCH.rsrp, when the value of KQI observations>0.uvw, Slope_pucch_interf_uvw means the slope of the regression for KPI DL.PDSCH.DTX.rate and KPI Avg.PUCCH.interference, when the value of KQI observations>0.uvw, where 0.uvw=0.015, 0.007, 0.003, 0.001, 0.000, respectively.

Table 19 illustrates examples of relationship among KPIs in Cell 2. Based on the results shown in Table 19, the direction of PUCCH.rsrp is not aligned with DL.PDSCH.DTX.rate, which means when DL.PDSCH.DTX.rate is becoming worse (larger values), the PUCCH.rsrp is becoming better (larger values).PUCCH.interference is aligned with DL.PDSCH.DTX.rate, which means when DL.PDSCH.DTX.rate is becoming worse (larger values), PUCCH.interference is also becoming worse (larger values).

TABLE 19

|  | Slope_pucch_rsrp_015 | Slope_pucch_interf_015 | Slope_pucch_rsrp_007 | Slope_pucch_interf_007 |
| --- | --- | --- | --- | --- |
| DL.PDSCH.DTX.Rt | −0.37145 | 0.492861 | −0.37635 | 0.469749 |

|  | Slope_pucch_rsrp_003 | Slope_pucch_interf_003 | Slope_pucch_rsrp_001 | Slope_pucch_rsrp_001 |
| --- | --- | --- | --- | --- |
| DL.PDSCH.DTX.Rt | −0.27069 | 0.358649 | −0.29009 | −0.29009 |

|  | Slope_pucch_interf_001 | Slope_pucch_rsrp_000 | Slope_pucch_interf_000 |
| --- | --- | --- | --- |
| DL.PDSCH.DTX.Rt | 0.330782 | −0.39473 | 0.394691 |

In one embodiment, a normalization method is disclosed. Denote the standard deviation of a vector (e.g., non-NA observations of KPI or KQI in a cell) as "sigma", and mathematical mean as "mean". If maximum (max) of the vector is larger than mean+3*sigma, then set max_1=mean+3*sigma, otherwise, max_1=max. If minimum (min) of the vector is less than mean−3*sigma, then set min_1=min−3*sigma, otherwise, min_1=min. If x>mean+3*sigma, the normalized value is set to 1; if x<mean−3*sigma, the normalized value is set to 0; otherwise, normalize observation x using formula (x−min_1)/(max_1−min_1). If max_1 and min_1 are equal, it gives NA to the normalized value. If we enforce sigma to be zero, then the method above becomes a general normalization method.

The current method does not delete any observations. However, we can also use other method, such as to delete the extreme points (outliers) at the ends. Removing the outliers can be to remove the extreme observations at the highest values and the lowest values. Removing the outliers can be for a KQI or a KPI, across all the observations of the KQI or the KPI in the cell, or across all the cells. Removing the outliers could also be per pair of a KQI and a KPI observed at the same time instances, where the KPI can be partitioned to segments according to the values of the KPI observations, and for each segment of the KPI observations, the outliers of the corresponding KQI observations can be removed. Using this method, the data can be cleaned before the KQI and KPI relationship determination. The normalization can be done before or after the data cleaning, i.e., the removal of the outliers.

Prior to determining the relationships of the KQI and KPIs, or prior to calculating the relationship indicators, preprocessing the KQI and KPIs can be carried out. Preprocessing includes normalization. Preprocessing may also include outlier removal, or data cleaning, which can be done before or after normalization. Certain filtering of the data may also apply for the data cleaning. For example, for certain rate related KPIs, such as the handover failure rate, packet loss rate, etc., the observations at the time instances when the total number of handover attempts, or the total number of packet transmissions is below certain threshold, then, the obtained handover failure rate or packet loss rate may not be reliable, hence, the observations can be removed or filtered out. The preprocessing may also include a direction adjustment of 1 minus a value of a normalized value of a KPI if the KPI is not along the same direction as the KQI when the wireless network is in a normal state, where the KPI not along the same direction as the KQI means when the KPI increases the KQI decreases or when the KPI decreases the KQI increases.

Throughout the disclosure, the time series can be the original time series with the original observations, or time series with the observations after some transformation, for example, some transformation of converting a non-stationary time series to a stationary time series.

Figure 13:
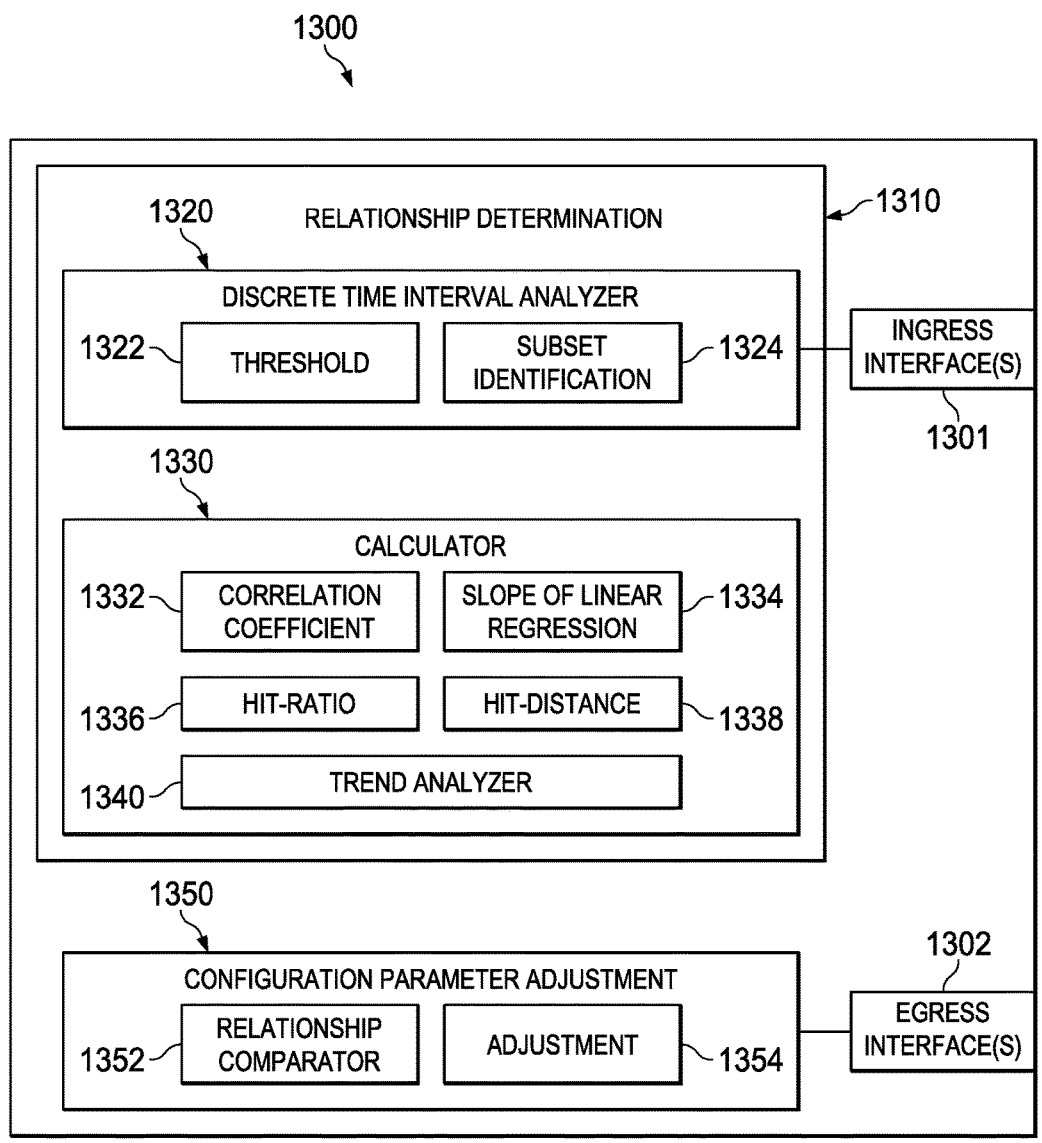
FIG. 13 illustrates a diagram of an embodiment controller adapted to adjust wireless configuration parameters in a wireless network based on relationships between a KQI and KPIs.

FIG. 13 illustrates a block diagram of an embodiment controller 1300 adapted to adjust wireless configuration parameters in a wireless network based on relationships between a KQI and KPIs. As shown, the embodiment controller 1300 includes one or more ingress interfaces 1301, one or more egress interfaces 1302, a relationship determination unit 1310 and a configuration parameter adjustment unit 1350. The one or more ingress interfaces 1301 may be configured to receive information (e.g., measurement reports, etc.) from devices (e.g., APs) in a wireless network. The relationship determination unit 1310 may include hardware and/or software adapted to determine relationships between a KQI and KPIs based on information received over the one or more ingress interfaces 1301. In this example, the relationship determination unit 1310 includes a discrete time interval analyzer 1320, a calculator 1330, and a trend analyzer 1340. The discrete time interval analyzer 1320 includes a threshold setting unit 1322 and a subset identification unit 1324. The threshold setting unit 1322 may include hardware and/or software adapted to analyze KQI and KPI values and set KQI and KPI thresholds. The subset identification unit 1324 may identify subsets of discrete time intervals in which a KPI and/or KPIs satisfy respective KQI and KPI thresholds. The calculator 1330 includes a correlation coefficient calculation unit 1332, a slope of linear regression calculation unit 1334, a hit ratio calculation unit 1336, and a hit distance calculation unit. 1338. The correlation coefficient calculation unit 1332 may include hardware and/or software adapted to calculate correlation coefficient between a KQI and KQIs during a subset of discrete time thresholds. The slope of linear regression calculation unit 1334 may include hardware and/or software adapted to calculate correlation slopes of linear regression between a KQI and KQIs during subsets of discrete time intervals. The hit ratio calculation unit 1336 and the hit distance calculation unit 1338 may include hardware and/or software for calculating hit-ratios and hit distances (respectively) between a KQI and KPIs during subsets of discrete time intervals. The trend analyzer 1340 may include hardware and/or software for determining trends between relationships over different subsets of discrete time intervals.

The configuration parameter adjustment unit 1350 may include a relationship comparator 1352 and an adjustment unit 1354. The relationship comparator 1352 may include hardware and/or software for comparing the relationships between a KQI and different KPIs. The relationship comparator 1352 may be configured to rank KPIs based on the strength of their relationship with a KQI. The adjustment unit 1354 may include hardware and/or software for adjusting wireless configuration parameters based on relationships between a KQI and KPIs, as well as comparison results between said relationships provided by the relationship comparator 1352. As mentioned above, units in the embodiment controller 1300 may be hardware, software, or a combination thereof. In one embodiment, one or more of the embodiment controller 1300 are integrated circuits, such as field programmable gate arrays (FPGAs) or application-specific integrated circuits (ASICs).

Figure 14:
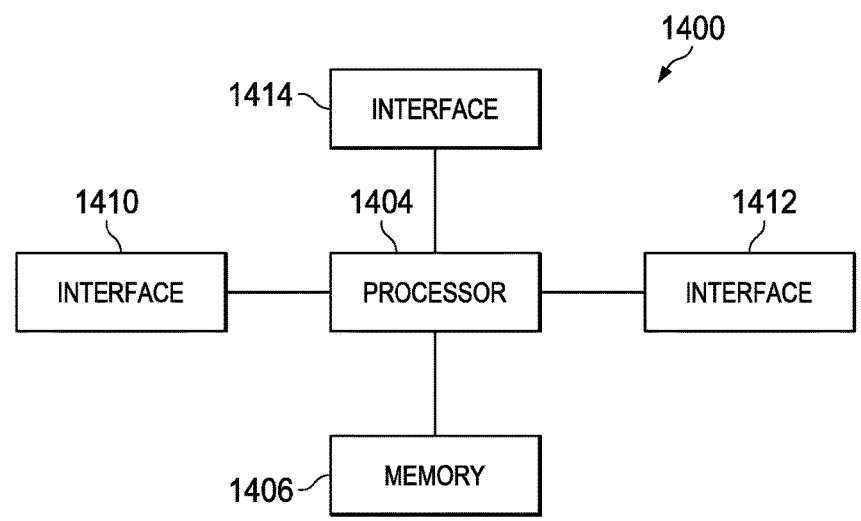
FIG. 14 illustrates a diagram of an embodiment processing system.

FIG. 14 is a block diagram of an embodiment processing system 1400 for performing methods described herein, which may be installed in a host device. As shown, the processing system 1400 includes a processor 1404, a memory 1406, and interfaces 1410-1414, which may (or may not) be arranged as shown in FIG. 14. The processor 1404 may be any component or collection of components adapted to perform computations and/or other processing related tasks, and the memory 1406 may be any component or collection of components adapted to store programming and/or instructions for execution by the processor 1404. In an embodiment, the memory 1406 includes a non-transitory computer readable medium. The interfaces 1410, 1412, 1414 may be any component or collection of components that allow the processing system 1400 to communicate with other devices/components and/or a user. For example, one or more of the interfaces 1410, 1412, 1414 may be adapted to communicate data, control, or management messages from the processor 904 to applications installed on the host device and/or a remote device. As another example, one or more of the interfaces 1410, 1412, 1414 may be adapted to allow a user or user device (e.g., personal computer (PC), etc.) to interact/communicate with the processing system 1400. The processing system 1400 may include additional components not depicted in FIG. 14, such as long term storage (e.g., non-volatile memory, etc.).

In some embodiments, the processing system 1400 is included in a network device that is accessing, or part otherwise of, a telecommunications network. In one example, the processing system 1400 is in a network-side device in a wireless or wireline telecommunications network, such as a base station, a relay station, a scheduler, a controller, a gateway, a router, an applications server, or any other device in the telecommunications network. In other embodiments, the processing system 1400 is in a user-side wireless device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 15:
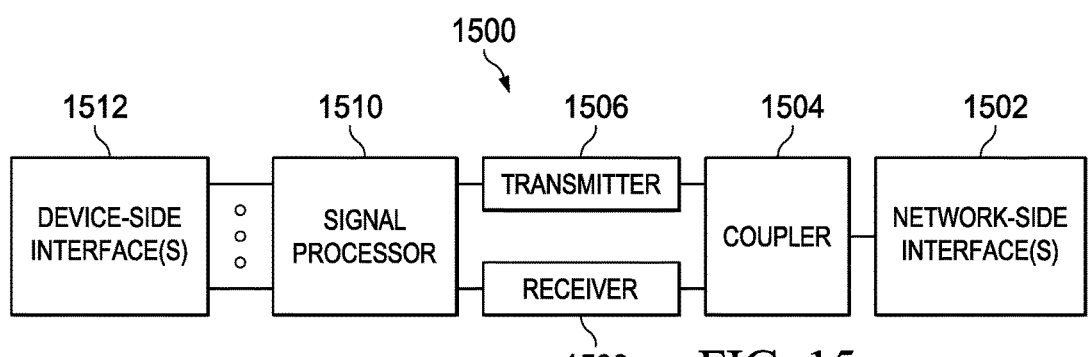
FIG. 15 illustrates a diagram of an embodiment transceiver.

In some embodiments, one or more of the interfaces 1410, 1412, 1414 connects the processing system 1400 to a transceiver adapted to transmit and receive signaling over the telecommunications network. FIG. 15 is a block diagram of a transceiver 1500 adapted to transmit and receive signaling over a telecommunications network. The transceiver 1500 may be installed in a host device. As shown, the transceiver 1500 comprises a network-side interface 1502, a coupler 1504, a transmitter 1506, a receiver 1508, a signal processor 1510, and a device-side interface 1512. The network-side interface 1502 may include any component or collection of components adapted to transmit or receive signaling over a wireless or wireline telecommunications network. The coupler 1504 may include any component or collection of components adapted to facilitate bi-directional communication over the network-side interface 1502. The transmitter 1506 may include any component or collection of components (e.g., up-converter, power amplifier, etc.) adapted to convert a baseband signal into a modulated carrier signal suitable for transmission over the network-side interface 1502. The receiver 1508 may include any component or collection of components (e.g., down-converter, low noise amplifier, etc.) adapted to convert a carrier signal received over the network-side interface 1502 into a baseband signal. The signal processor 1510 may include any component or collection of components adapted to convert a baseband signal into a data signal suitable for communication over the device-side interface(s) 1512, or vice-versa. The device-side interface(s) 1512 may include any component or collection of components adapted to communicate data-signals between the signal processor 1510 and components within the host device (e.g., the processing system 1400, local area network (LAN) ports, etc.).

The transceiver 1500 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1502 comprises one or more antenna/radiating elements. For example, the network-side interface 1502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adjusting parameters of a wireless network, the method comprising:

receiving, by a controller in the wireless network, a key quality indicator (KQI) and two or more key performance indicators (KPIs) associated with wireless transmissions in the wireless network during a first period;

identifying, by the controller, one or more subsets of discrete time intervals in the first period in which the KQI fails to satisfy quality criteria;

calculating, by the controller, relationship indicators between the KQI and the two or more KPIs during the one or more subsets of discrete time intervals, the relationship indicators include hit-ratio correlation coefficients indicating degrees to which a difference between the KQI and a quality threshold correlates to a difference between a corresponding one of the two or more KPIs and a corresponding performance threshold; and adjusting, by the controller, configuration parameters that are to be used to operate the wireless network during a second or subsequent period based on the relationships between the KQI and the two or more KPIs.

2. The method of claim 1, wherein the relationship indicators include correlation coefficients indicating degrees to which a value of the KQI is related to values of corresponding ones of the two or more KPIs.

3. The method of claim 1, wherein the relationship indicators include slopes of linear regression indicating degrees in which a change in a value of the KQI is attributable to changes in values of the two or more KPIs.

4. The method of claim 1, wherein the relationship indicators include hit-ratios indicating a ratio of a number of instances in which both a value of the KQI exceeds a quality threshold and a value of a corresponding one of the two or more KPIs exceeds a corresponding performance threshold to a total number of instances in which the value of the KQI exceeds the quality threshold.

5. The method of claim 1, wherein the one or more subsets of discrete time intervals includes at least a first subset of discrete time intervals in which the KQI fails to satisfy a lower quality criteria, and a second subset of discrete time intervals in which the KQI fails to satisfy a higher quality criteria, the first subset of discrete time intervals including at least one time interval excluded from the second subset of discrete time intervals.

6. The method of claim 5, wherein determining relationships between the KQI and the two or more KPIs during the one or more subsets of discrete time intervals comprises:
calculating a first set of relationship indicators between the KQI and the two or more KPIs during the first subset of discrete time intervals;
calculating a second set of relationship indicators between the KQI and the two or more KPIs during the second subset of discrete time intervals; and
determining a trend between at least the first set of relationship indicators and the second set of relationship indicators.

7. The method of claim 1, wherein adjusting the configuration parameters of the wireless network in accordance with the relationships between the KQI and the two or more KPIs comprises:
ranking the two or more KPIs based on the relationship indicators; and
adjusting the configuration parameters to improve two or more of the higher-ranked KPIs.

8. The method of claim 1, wherein determining the relationships between the KQI and the two or more KPIs comprises:
identifying a first subset of discrete time intervals in the first period in which both a value of the KQI exceeds a quality threshold and a value of a first KPI exceeds a first performance threshold;
identifying a second subset of discrete time intervals during the first period in which both the value of the KQI exceeds the quality threshold and a value of a second KPI exceeds a second performance threshold; and
calculating a first relationship indicator between the KQI and the first KPI during the first subset of discrete time intervals and a second relationship indicator between the KQI and the second KPI during the second subset of discrete time intervals.

9. The method of claim 8, wherein adjusting the configuration parameters of the wireless network in accordance with the relationships between the KQI and the two or more KPIs comprises:
adjusting the configuration parameters to improve the first KPI when the first relationship indicator exceeds the second relationship indicator; and
adjusting the configuration parameters to improve the second KPI when the second relationship indicator exceeds the first relationship indicator.

10. The method of claim 1, wherein determining the relationships between the KQI and the two or more KPIs comprises:
identifying a first subset of discrete time intervals in the first period in which both a value of the KQI exceeds a first quality threshold and a value of a first KPI exceeds a first performance threshold;
identifying a second subset of discrete time intervals in the first period in which both the value of the KQI exceeds a second quality threshold and the value of the first KPI exceeds a second performance threshold, the second quality threshold being different than the first quality threshold, and the second performance threshold being different than the first performance threshold; and
calculating a first relationship indicator between the KQI and the first KPI during the first subset of discrete time intervals and a second relationship indicator between the KQI and the first KPI during the second subset of discrete time intervals.

11. The method of claim 10, wherein the first quality threshold and the first performance threshold correspond to a same percentile in values of the KQI and the first KPI, respectively, and
wherein the second quality threshold and the second performance threshold correspond to the same percentile in values of the KQI and the first KPI, respectively.

12. The method of claim 1, wherein determining the relationships between the KQI and the two or more KPIs comprises:
preprocessing the KQI wherein preprocessing includes normalization; and
preprocessing the two or more KPIs wherein preprocessing includes normalization, and a direction adjustment of 1 minus a value of a normalized value of a KPI if the KPI is not along a same direction as the KQI when the wireless network is in a normal state, wherein the KPI not along the same direction as the KQI corresponds to a decrease in the KQI in response to an increase in the KPI or to an increase in the KQI in response to a decrease in the KPI.

13. An apparatus in a wireless network comprising:
a non-transitory memory storage comprising instructions; and
a processor in communication with the non-transitory memory storage, wherein the processor executes the instructions to:
receive a key quality indicator (KQI) and two or more key performance indicators (KPIs) associated with wireless transmissions in the wireless network during a first period;
identify one or more subsets of discrete time intervals in the first period in which the KQI fails to satisfy quality criteria;
calculate relationship indicators between the KQI and the two or more KPIs during the one or more subsets of discrete time intervals, the relationship indicators include hit-ratios indicating a ratio of a number of instances in which both a value of the KQI exceeds a quality threshold and a value of a corresponding one of the two or more KPIs exceeds a corresponding performance threshold to a total number of instances in which the value of the KQI exceeds the quality threshold; and adjust configuration parameters that are to be used to operate the wireless network during a second or subsequent period based on the relationships between the KQI and the two or more KPIs.

14. The apparatus of claim 13, wherein the relationship indicators include correlation coefficients indicating degrees to which a value of the KQI is related to values of corresponding ones of the two or more KPIs.

15. The apparatus of claim 13, wherein the relationship indicators include slopes of linear regression indicating degrees in which a change in a value of the KQI is attributable to changes in values of the two or more KPIs.

16. The apparatus of claim 13, wherein the relationship indicators include hit-ratio correlation coefficients indicating degrees to which a difference between the KQI and a quality threshold correlates to a difference between a corresponding one of the two or more KPIs and a corresponding performance threshold.

\* \* \* \* \*